US010896692B2

(12) United States Patent
Kurokawa et al.

(10) Patent No.: US 10,896,692 B2
(45) Date of Patent: *Jan. 19, 2021

(54) MAGNETIC TAPE

(71) Applicant: FUJIFILM Corporation, Tokyo (JP)

(72) Inventors: Takuto Kurokawa, Minami-ashigara (JP); Norihito Kasada, Minami-ashigara (JP); Masahito Oyanagi, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 134 days.

This patent is subject to a terminal disclaimer.

(21) Appl. No.: 15/443,094

(22) Filed: Feb. 27, 2017

(65) Prior Publication Data
US 2017/0249965 A1 Aug. 31, 2017

(30) Foreign Application Priority Data
Feb. 29, 2016 (JP) ................. 2016-037574

(51) Int. Cl.
G11B 5/73 (2006.01)
G11B 5/735 (2006.01)
G11B 5/733 (2006.01)
G11B 5/78 (2006.01)

(52) U.S. Cl.
CPC .............. G11B 5/735 (2013.01); G11B 5/733 (2013.01); G11B 5/78 (2013.01)

(58) Field of Classification Search
CPC ............ G11B 5/735; G11B 5/733; G11B 5/78
See application file for complete search history.

(56) References Cited

U.S. PATENT DOCUMENTS

| | | |
|---|---|---|
| 3,966,686 A | 6/1976 | Asakura et al. |
| 4,112,187 A | 9/1978 | Asakura et al. |
| 4,425,404 A | 1/1984 | Suzuki et al. |
| 4,693,930 A | 9/1987 | Kuo et al. |
| 4,746,569 A | 5/1988 | Takahashi et al. |
| 4,825,317 A | 4/1989 | Rausch |
| 5,006,406 A * | 4/1991 | Kovacs ................. G11B 5/70 428/323 |
| 5,242,752 A | 9/1993 | Isobe et al. |
| 5,419,938 A | 5/1995 | Kagotani et al. |
| 5,445,881 A | 8/1995 | Irie |
| 5,474,814 A | 12/1995 | Komatsu et al. |
| 5,496,607 A | 3/1996 | Inaba et al. |
| 5,540,957 A | 7/1996 | Ueda et al. |
| 5,585,032 A | 12/1996 | Nakata et al. |
| 5,645,917 A | 7/1997 | Ejiri et al. |
| 5,689,384 A | 11/1997 | Albrecht et al. |
| 5,728,454 A | 3/1998 | Inaba et al. |
| 5,786,074 A | 7/1998 | Soui |
| 5,827,600 A | 10/1998 | Ejiri et al. |
| 5,835,314 A | 11/1998 | Moodera et al. |
| 6,099,957 A | 8/2000 | Yamamoto et al. |
| 6,183,606 B1 | 2/2001 | Kuo et al. |
| 6,207,252 B1 | 3/2001 | Shimomura |
| 6,228,461 B1 | 5/2001 | Sueki et al. |
| 6,254,964 B1 | 7/2001 | Saito et al. |
| 6,261,647 B1 | 7/2001 | Komatsu et al. |
| 6,268,043 B1 | 7/2001 | Koizumi et al. |
| 6,496,328 B1 | 12/2002 | Dugas |
| 6,579,826 B2 | 6/2003 | Furuya et al. |
| 6,649,256 B1 | 11/2003 | Buczek et al. |
| 6,686,022 B2 | 2/2004 | Takano et al. |
| 6,770,359 B2 | 8/2004 | Masaki |
| 6,791,803 B2 | 9/2004 | Saito et al. |
| 6,835,451 B2 | 12/2004 | Ejiri |
| 6,835,461 B1 | 12/2004 | Yamagata et al. |
| 6,893,746 B1 | 5/2005 | Kirino et al. |
| 6,921,592 B2 | 7/2005 | Tani et al. |
| 6,939,606 B2 | 9/2005 | Hashimoto et al. |
| 6,950,269 B1 | 9/2005 | Johnson |
| 6,994,925 B2 | 2/2006 | Masaki |
| 7,014,927 B2 | 3/2006 | Sueki et al. |
| 7,029,726 B1 | 4/2006 | Chen et al. |
| 7,153,366 B1 | 12/2006 | Chen et al. |
| 7,255,908 B2 | 8/2007 | Ishikawa et al. |
| 7,511,907 B2 | 3/2009 | Dugas et al. |
| 7,515,383 B2 | 4/2009 | Saito et al. |
| 7,656,602 B2 | 2/2010 | Iben et al. |
| 7,803,471 B1 | 9/2010 | Ota et al. |
| 7,839,599 B2 | 11/2010 | Bui et al. |
| 8,000,057 B2 | 8/2011 | Bui et al. |
| 8,279,739 B2 | 10/2012 | Kanbe et al. |
| 8,318,242 B2 | 11/2012 | Bradshaw et al. |
| 8,524,108 B2 | 9/2013 | Hattori |
| 8,535,817 B2 | 9/2013 | Imaoka |
| 8,576,510 B2 | 11/2013 | Cherubini et al. |
| 8,681,451 B2 | 3/2014 | Harasawa et al. |
| 9,105,294 B2 | 8/2015 | Jensen et al. |
| 9,159,341 B2 | 10/2015 | Bradshaw et al. |
| 9,311,946 B2 | 4/2016 | Tanaka et al. |
| 9,324,343 B2 | 4/2016 | Bradshaw et al. |
| 9,495,985 B2 | 11/2016 | Biskeborn et al. |
| 9,530,444 B2 | 12/2016 | Kasada |
| 9,542,967 B2 | 1/2017 | Sekiguchi et al. |
| 9,564,161 B1 | 2/2017 | Cherubini et al. |
| 9,601,146 B2 | 3/2017 | Kasada et al. |
| 9,704,425 B2 | 7/2017 | Zhang et al. |

(Continued)

FOREIGN PATENT DOCUMENTS

| | | |
|---|---|---|
| CN | 1691139 A | 11/2005 |
| CN | 101105949 A | 1/2008 |

(Continued)

OTHER PUBLICATIONS

English machine translation of JP 63-298813; 1988, pp. 1-8.*

(Continued)

Primary Examiner — Holly C Rickman
(74) Attorney, Agent, or Firm — Sughrue Mion, PLLC

(57) ABSTRACT

The magnetic tape has a magnetic layer containing ferromagnetic powder and binder on one surface of a nonmagnetic support and has a backcoat layer containing nonmagnetic powder and binder on the other surface thereof, wherein the thickness of the backcoat layer is less than or equal to 0.20 μm, and the contact angle for 1-bromonaphthalene that is measured on the surface of the backcoat layer falls within a range of 10.0° to 30.0°.

10 Claims, No Drawings

(56) References Cited

U.S. PATENT DOCUMENTS

| | | |
|---|---|---|
| 9,704,525 B2 | 7/2017 | Kasada |
| 9,704,527 B2 | 7/2017 | Kasada |
| 9,711,174 B2 | 7/2017 | Kasada et al. |
| 9,721,605 B2 | 8/2017 | Oyanagi et al. |
| 9,721,606 B2 | 8/2017 | Kasada |
| 9,721,607 B2 | 8/2017 | Tada et al. |
| 9,748,026 B2 | 8/2017 | Shirata |
| 9,773,519 B2 | 9/2017 | Kasada et al. |
| 9,779,772 B1 | 10/2017 | Kasada et al. |
| 9,837,104 B1 | 12/2017 | Biskeborn |
| 9,837,116 B2 | 12/2017 | Ozawa et al. |
| 9,959,894 B2 | 5/2018 | Omura |
| 9,972,351 B1 | 5/2018 | Kaneko et al. |
| 9,978,414 B1 | 5/2018 | Kaneko et al. |
| 9,984,710 B2 | 5/2018 | Kasada |
| 9,984,712 B1 | 5/2018 | Ozawa |
| 9,984,716 B2 | 5/2018 | Kaneko et al. |
| 10,008,230 B1 | 6/2018 | Ozawa et al. |
| 10,026,430 B2 | 7/2018 | Kasada et al. |
| 10,026,433 B2 | 7/2018 | Kasada et al. |
| 10,026,434 B2 | 7/2018 | Oyanagi et al. |
| 10,026,435 B2 | 7/2018 | Kasada et al. |
| 10,062,403 B1 | 8/2018 | Kasada et al. |
| 10,074,393 B2 | 9/2018 | Kaneko et al. |
| 10,134,433 B2 | 11/2018 | Kasada et al. |
| 10,170,144 B2 | 1/2019 | Ozawa et al. |
| 2001/0038928 A1 | 11/2001 | Nakamigawa et al. |
| 2001/0053458 A1 | 12/2001 | Suzuki et al. |
| 2002/0072472 A1 | 7/2002 | Furuya et al. |
| 2002/0122339 A1 | 9/2002 | Takano et al. |
| 2003/0059649 A1 | 3/2003 | Saliba et al. |
| 2003/0091866 A1 | 5/2003 | Ejiri et al. |
| 2003/0124386 A1 | 7/2003 | Masaki |
| 2003/0128453 A1 | 7/2003 | Saito et al. |
| 2003/0170498 A1 | 9/2003 | Inoue |
| 2003/0228493 A1 | 12/2003 | Doushita et al. |
| 2004/0018388 A1 | 1/2004 | Kitamura et al. |
| 2004/0053074 A1 | 3/2004 | Jingu et al. |
| 2004/0072025 A1 | 4/2004 | Kishimoto et al. |
| 2004/0197605 A1 | 10/2004 | Seki et al. |
| 2004/0213948 A1 | 10/2004 | Saito et al. |
| 2004/0218304 A1 | 11/2004 | Goker et al. |
| 2004/0265643 A1* | 12/2004 | Ejiri ............... G11B 5/584 428/837 |
| 2005/0057838 A1 | 3/2005 | Ohtsu |
| 2005/0153170 A1 | 7/2005 | Inoue et al. |
| 2005/0196645 A1 | 9/2005 | Doi et al. |
| 2005/0260456 A1 | 11/2005 | Hanai et al. |
| 2005/0260459 A1 | 11/2005 | Hanai et al. |
| 2005/0264935 A1 | 12/2005 | Sueki et al. |
| 2006/0008681 A1 | 1/2006 | Hashimoto et al. |
| 2006/0035114 A1 | 2/2006 | Kuse et al. |
| 2006/0056095 A1 | 3/2006 | Saitou |
| 2006/0068232 A1 | 3/2006 | Mikamo et al. |
| 2006/0187589 A1 | 8/2006 | Harasawa et al. |
| 2006/0232883 A1 | 10/2006 | Biskeborn et al. |
| 2007/0009769 A1 | 1/2007 | Kanazawa |
| 2007/0020489 A1 | 1/2007 | Yamazaki et al. |
| 2007/0020490 A1 | 1/2007 | Harasawa et al. |
| 2007/0224456 A1 | 9/2007 | Murao et al. |
| 2007/0230054 A1 | 10/2007 | Takeda et al. |
| 2007/0231606 A1 | 10/2007 | Hanai |
| 2008/0057351 A1 | 3/2008 | Meguro et al. |
| 2008/0144211 A1 | 6/2008 | Weber et al. |
| 2008/0152956 A1 | 6/2008 | Murayama et al. |
| 2008/0174897 A1 | 7/2008 | Bates et al. |
| 2008/0297950 A1 | 12/2008 | Noguchi et al. |
| 2008/0311308 A1 | 12/2008 | Lee et al. |
| 2009/0027812 A1 | 1/2009 | Noguchi et al. |
| 2009/0087689 A1 | 4/2009 | Doushita et al. |
| 2009/0161249 A1 | 6/2009 | Takayama et al. |
| 2009/0162701 A1 | 6/2009 | Jensen et al. |
| 2010/0000966 A1 | 1/2010 | Kamata et al. |
| 2010/0035086 A1 | 2/2010 | Inoue et al. |
| 2010/0035088 A1 | 2/2010 | Inoue |
| 2010/0053810 A1 | 3/2010 | Biskeborn et al. |
| 2010/0073816 A1 | 3/2010 | Komori et al. |
| 2010/0081011 A1 | 4/2010 | Nakamura |
| 2010/0134929 A1 | 6/2010 | Ito |
| 2010/0227201 A1 | 9/2010 | Sasaki et al. |
| 2010/0246073 A1 | 9/2010 | Katayama |
| 2011/0003241 A1 | 1/2011 | Kaneko et al. |
| 2011/0051280 A1 | 3/2011 | Karp et al. |
| 2011/0052908 A1 | 3/2011 | Imaoka |
| 2011/0077902 A1 | 3/2011 | Awezec et al. |
| 2011/0151281 A1 | 6/2011 | Inoue |
| 2011/0244272 A1 | 10/2011 | Suzuki et al. |
| 2012/0045664 A1 | 2/2012 | Tanaka et al. |
| 2012/0152891 A1 | 6/2012 | Brown et al. |
| 2012/0177951 A1 | 7/2012 | Yamazaki et al. |
| 2012/0183811 A1 | 7/2012 | Hattori et al. |
| 2012/0196156 A1 | 8/2012 | Suzuki |
| 2012/0243120 A1 | 9/2012 | Harasawa et al. |
| 2012/0244387 A1 | 9/2012 | Mori et al. |
| 2012/0251845 A1 | 10/2012 | Wang et al. |
| 2013/0029183 A1 | 1/2013 | Omura et al. |
| 2013/0084470 A1 | 4/2013 | Hattori et al. |
| 2013/0088794 A1 | 4/2013 | Cherubini et al. |
| 2013/0256584 A1 | 10/2013 | Yamazaki et al. |
| 2013/0260179 A1 | 10/2013 | Kasada et al. |
| 2013/0279040 A1 | 10/2013 | Cideciyan et al. |
| 2013/0286510 A1 | 10/2013 | Rothermel et al. |
| 2014/0011055 A1 | 1/2014 | Suzuki et al. |
| 2014/0130067 A1 | 5/2014 | Madison et al. |
| 2014/0139944 A1 | 5/2014 | Johnson et al. |
| 2014/0272474 A1 | 9/2014 | Kasada |
| 2014/0295214 A1 | 10/2014 | Tada et al. |
| 2014/0342189 A1 | 11/2014 | Tachibana et al. |
| 2014/0366990 A1 | 12/2014 | Lai et al. |
| 2014/0374645 A1* | 12/2014 | Kikuchi ............... G11B 5/7013 252/62.54 |
| 2015/0043101 A1 | 2/2015 | Biskeborn et al. |
| 2015/0098149 A1 | 4/2015 | Bates et al. |
| 2015/0111066 A1 | 4/2015 | Terakawa et al. |
| 2015/0123026 A1 | 5/2015 | Masada et al. |
| 2015/0302879 A1 | 10/2015 | Holmberg et al. |
| 2015/0380036 A1 | 12/2015 | Kasada et al. |
| 2016/0061447 A1 | 3/2016 | Kobayashi |
| 2016/0064025 A1 | 3/2016 | Kurokawa et al. |
| 2016/0092315 A1 | 3/2016 | Ashida et al. |
| 2016/0093321 A1 | 3/2016 | Aoshima et al. |
| 2016/0093322 A1 | 3/2016 | Kasada et al. |
| 2016/0093323 A1 | 3/2016 | Omura |
| 2016/0180875 A1 | 6/2016 | Tanaka et al. |
| 2016/0189739 A1 | 6/2016 | Kasada et al. |
| 2016/0189740 A1 | 6/2016 | Oyanagi et al. |
| 2016/0247530 A1 | 8/2016 | Kasada |
| 2016/0260449 A1 | 9/2016 | Ahmad et al. |
| 2016/0276076 A1 | 9/2016 | Kasada |
| 2017/0032812 A1 | 2/2017 | Kasada |
| 2017/0053669 A1 | 2/2017 | Kasada |
| 2017/0053670 A1 | 2/2017 | Oyanagi et al. |
| 2017/0053671 A1 | 2/2017 | Kasada et al. |
| 2017/0058227 A1 | 3/2017 | Kondo et al. |
| 2017/0092315 A1 | 3/2017 | Ozawa et al. |
| 2017/0130156 A1 | 5/2017 | Kondo et al. |
| 2017/0178675 A1 | 6/2017 | Kasada |
| 2017/0178676 A1 | 6/2017 | Kasada |
| 2017/0178677 A1 | 6/2017 | Kasada |
| 2017/0186456 A1 | 6/2017 | Tada et al. |
| 2017/0186460 A1 | 6/2017 | Kasada et al. |
| 2017/0221513 A1 | 8/2017 | Hiroi et al. |
| 2017/0221516 A1 | 8/2017 | Oyanagi et al. |
| 2017/0221517 A1 | 8/2017 | Ozawa et al. |
| 2017/0249963 A1 | 8/2017 | Oyanagi et al. |
| 2017/0249964 A1 | 8/2017 | Kasada et al. |
| 2017/0249966 A1 | 8/2017 | Tachibana et al. |
| 2017/0287517 A1 | 10/2017 | Hosoya et al. |
| 2017/0337944 A1 | 11/2017 | Biskeborn et al. |
| 2017/0355022 A1 | 12/2017 | Kaneko et al. |
| 2017/0358318 A1 | 12/2017 | Kasada et al. |
| 2017/0372726 A1 | 12/2017 | Kasada et al. |
| 2017/0372727 A1 | 12/2017 | Kasada et al. |
| 2017/0372736 A1 | 12/2017 | Kaneko et al. |

(56) References Cited

U.S. PATENT DOCUMENTS

| | | |
|---|---|---|
| 2017/0372737 A1 | 12/2017 | Oyanagi et al. |
| 2017/0372738 A1 | 12/2017 | Kasada |
| 2017/0372739 A1 | 12/2017 | Ozawa et al. |
| 2017/0372740 A1 | 12/2017 | Ozawa et al. |
| 2017/0372741 A1 | 12/2017 | Kurokawa et al. |
| 2017/0372742 A1 | 12/2017 | Kaneko et al. |
| 2017/0372743 A1 | 12/2017 | Kasada et al. |
| 2017/0372744 A1 | 12/2017 | Ozawa et al. |
| 2018/0061446 A1 | 3/2018 | Kasada |
| 2018/0061447 A1 | 3/2018 | Kasada |
| 2018/0082710 A1 | 3/2018 | Tada et al. |
| 2018/0137887 A1 | 5/2018 | Sekiguchi et al. |
| 2018/0182417 A1 | 6/2018 | Kaneko et al. |
| 2018/0182422 A1 | 6/2018 | Kawakami et al. |
| 2018/0182425 A1 | 6/2018 | Kasada et al. |
| 2018/0182426 A1 | 6/2018 | Ozawa et al. |
| 2018/0182427 A1 | 6/2018 | Kasada et al. |
| 2018/0182428 A1 | 6/2018 | Kasada et al. |
| 2018/0182429 A1 | 6/2018 | Kasada et al. |
| 2018/0182430 A1 | 6/2018 | Ozawa et al. |
| 2018/0240475 A1 | 8/2018 | Kasada |
| 2018/0240476 A1 | 8/2018 | Kasada et al. |
| 2018/0240478 A1 | 8/2018 | Kasada et al. |
| 2018/0240479 A1 | 8/2018 | Kasada et al. |
| 2018/0240481 A1 | 8/2018 | Kasada et al. |
| 2018/0240488 A1 | 8/2018 | Kasada |
| 2018/0240489 A1 | 8/2018 | Kasada et al. |
| 2018/0240490 A1 | 8/2018 | Kurokawa et al. |
| 2018/0240491 A1 | 8/2018 | Ozawa et al. |
| 2018/0240492 A1 | 8/2018 | Kasada |
| 2018/0240493 A1 | 8/2018 | Tada et al. |
| 2018/0240494 A1 | 8/2018 | Kurokawa et al. |
| 2018/0240495 A1 | 8/2018 | Kasada |
| 2018/0286439 A1 | 10/2018 | Ozawa et al. |
| 2018/0286442 A1 | 10/2018 | Ozawa et al. |
| 2018/0286443 A1 | 10/2018 | Ozawa et al. |
| 2018/0286444 A1 | 10/2018 | Kasada et al. |
| 2018/0286446 A1 | 10/2018 | Ozawa et al. |
| 2018/0286447 A1 | 10/2018 | Ozawa et al. |
| 2018/0286448 A1 | 10/2018 | Ozawa et al. |
| 2018/0286449 A1 | 10/2018 | Kasada et al. |
| 2018/0286450 A1 | 10/2018 | Kasada et al. |
| 2018/0286451 A1 | 10/2018 | Ozawa et al. |
| 2018/0286452 A1 | 10/2018 | Ozawa et al. |
| 2018/0286453 A1 | 10/2018 | Kasada et al. |
| 2018/0301165 A1 | 10/2018 | Oyanagi et al. |
| 2018/0350398 A1 | 12/2018 | Kawakami et al. |
| 2018/0350400 A1 | 12/2018 | Kaneko et al. |
| 2018/0358042 A1 | 12/2018 | Kasada et al. |
| 2018/0374507 A1 | 12/2018 | Kasada |
| 2019/0027167 A1 | 1/2019 | Tada et al. |
| 2019/0027168 A1 | 1/2019 | Kasada et al. |
| 2019/0027171 A1 | 1/2019 | Kasada |
| 2019/0027172 A1 | 1/2019 | Kasada |
| 2019/0027174 A1 | 1/2019 | Tada et al. |
| 2019/0027175 A1 | 1/2019 | Kurokawa et al. |
| 2019/0027176 A1 | 1/2019 | Kurokawa et al. |
| 2019/0027177 A1 | 1/2019 | Kasada |
| 2019/0027178 A1 | 1/2019 | Kasada |
| 2019/0027179 A1 | 1/2019 | Ozawa et al. |
| 2019/0027180 A1 | 1/2019 | Kasada et al. |
| 2019/0027181 A1 | 1/2019 | Ozawa et al. |
| 2019/0035424 A1 | 1/2019 | Endo |
| 2019/0051325 A1 | 2/2019 | Kasada et al. |
| 2019/0088278 A1 | 3/2019 | Kasada et al. |
| 2019/0096437 A1 | 3/2019 | Ozawa et al. |
| 2019/0103130 A1 | 4/2019 | Kasada et al. |
| 2019/0103131 A1 | 4/2019 | Kasada et al. |
| 2019/0103133 A1 | 4/2019 | Ozawa et al. |
| 2019/0103134 A1 | 4/2019 | Kasada et al. |
| 2019/0103135 A1 | 4/2019 | Ozawa et al. |
| 2019/0130936 A1 | 5/2019 | Kaneko et al. |
| 2019/0295587 A1 | 9/2019 | Kasada |
| 2019/0295590 A1 | 9/2019 | Kaneko et al. |
| 2020/0005814 A1 | 1/2020 | Kasada et al. |
| 2020/0005818 A1 | 1/2020 | Kasada et al. |
| 2020/0005822 A1 | 1/2020 | Kasada et al. |
| 2020/0005827 A1 | 1/2020 | Ozawa et al. |
| 2020/0035262 A1 | 1/2020 | Kasada |
| 2020/0126589 A1 | 4/2020 | Iwamoto et al. |

FOREIGN PATENT DOCUMENTS

| | | |
|---|---|---|
| CN | 105324650 A | 2/2016 |
| DE | 101 46 429 A1 | 3/2002 |
| EP | 0 520 155 B1 | 8/1996 |
| GB | 2495356 A | 4/2013 |
| JP | 61-11924 A | 1/1986 |
| JP | 61-139923 A | 6/1986 |
| JP | 61-139932 A | 6/1986 |
| JP | 63-129519 A | 6/1988 |
| JP | 63-249932 A | 10/1988 |
| JP | 64-057422 A | 3/1989 |
| JP | 64-60819 A | 3/1989 |
| JP | 2-227821 A | 9/1990 |
| JP | 5-258283 A | 10/1993 |
| JP | 5-298653 A | 11/1993 |
| JP | 7-57242 A | 3/1995 |
| JP | 11-110743 A | 4/1999 |
| JP | 11-175949 A | 7/1999 |
| JP | 11-259849 A | 9/1999 |
| JP | 11-273051 A | 10/1999 |
| JP | 2000-251240 A | 9/2000 |
| JP | 2002-157726 A | 5/2002 |
| JP | 2002-298332 A | 10/2002 |
| JP | 2002-329605 A | 11/2002 |
| JP | 2002-367142 A | 12/2002 |
| JP | 2002-367318 A | 12/2002 |
| JP | 2003-77116 A | 3/2003 |
| JP | 2003-323710 A | 11/2003 |
| JP | 2004-005820 A | 1/2004 |
| JP | 2004-103186 A | 4/2004 |
| JP | 2004-114492 A | 4/2004 |
| JP | 2004-133997 A | 4/2004 |
| JP | 2004-185676 A | 7/2004 |
| JP | 2005-38579 A | 2/2005 |
| JP | 2005-092967 A | 4/2005 |
| JP | 2005-243063 A | 9/2005 |
| JP | 2005-243162 A | 9/2005 |
| JP | 2006-92672 A | 4/2006 |
| JP | 2006-286114 A | 10/2006 |
| JP | 2007-265555 A | 10/2007 |
| JP | 2007-273039 A | 10/2007 |
| JP | 2007-287310 A | 11/2007 |
| JP | 2007-297427 A | 11/2007 |
| JP | 2007-305197 A | 11/2007 |
| JP | 2008-047276 A | 2/2008 |
| JP | 2008-243317 A | 10/2008 |
| JP | 2009-245515 A | 10/2009 |
| JP | 2009-283082 A | 12/2009 |
| JP | 2010-036350 A | 2/2010 |
| JP | 2010-049731 A | 3/2010 |
| JP | 2011-48878 A | 3/2011 |
| JP | 2011-138566 A | 7/2011 |
| JP | 2011-187142 A | 9/2011 |
| JP | 2011-210288 A | 10/2011 |
| JP | 2011-225417 A | 11/2011 |
| JP | 2012-38367 A | 2/2012 |
| JP | 2012-043495 A | 3/2012 |
| JP | 2012-203955 A | 10/2012 |
| JP | 2013-25853 A | 2/2013 |
| JP | 2013-77360 A | 4/2013 |
| JP | 2013-164889 A | 8/2013 |
| JP | 2014-15453 A | 1/2014 |
| JP | 2014-179149 A | 9/2014 |
| JP | 2015-39801 A | 3/2015 |
| JP | 2015-111484 A | 6/2015 |
| JP | 2016-15183 A | 1/2016 |
| JP | 2016-502224 A | 1/2016 |
| JP | 2016-051493 A | 4/2016 |
| JP | 2016-071912 A | 5/2016 |
| JP | 2016-71926 A | 5/2016 |
| JP | 2016-126817 A | 7/2016 |

(56) References Cited

FOREIGN PATENT DOCUMENTS

| JP | 2016-139451 A | 8/2016 |
|---|---|---|
| JP | 2016-177851 A | 10/2016 |
| JP | 2017-041291 A | 2/2017 |

OTHER PUBLICATIONS

Notice of Allowance dated Mar. 14, 2018 in U.S. Appl. No. 15/854,329.
Office Action dated Aug. 27, 2019 in Japanese Application No. 2016-254428.
Office Action dated Aug. 27, 2019 in Japanese Application No. 2016-254430.
Office Action dated Aug. 27, 2019 in Japanese Application No. 2016-254432.
Office Action dated Mar. 5, 2019 in U.S. Appl. No. 15/854,397.
Office Action dated Oct. 12, 2018 in U.S. Appl. No. 15/854,397.
Office Action dated Sep. 16, 2019 in U.S. Appl. No. 15/854,403.
Office Action dated Sep. 17, 2019 in Japanese Application No. 2017-029499.
Office Action dated Sep. 19, 2019 in U.S. Appl. No. 15/443,026.
Office Action dated Sep. 3, 2019 in Japanese Application No. 2016-254434.
Office Action dated Sep. 20, 2019 in U.S. Appl. No. 15/442,961.
Office Action dated Sep. 24, 2019 in Japanese Application No. 2017-065730.
Office Action dated Sep. 24, 2019 in Japanese Application No. 2017-029491.
Office Action dated Sep. 24, 2019 in Japanese Application No. 2017-029508.
Office Action dated Sep. 24, 2019 in Japanese Application No. 2016-254441.
Office Action dated Sep. 24, 2019 in Japanese Application No. 2016-254439.
Office Action dated Sep. 24, 2019 in Japanese Application No. 2016-254436.
Office Action dated Sep. 24, 2019 in Japanese Application No. 2016-254450.
Office Action dated Aug. 28, 2019 in U.S. Appl. No. 15/854,397.
Office Action dated Jun. 25, 2019 in Japanese Application No. 2015-245144.
Notice of Allowance dated Jul. 16, 2019 in U.S. Appl. No. 15/900,144.
Notice of Allowance dated Jul. 31, 2019 in U.S. Appl. No. 16/100,289.
Notice of Allowance dated Jul. 31, 2019 in U.S. Appl. No. 16/143,646.
Notice of Allowance dated Jun. 25, 2019 in U.S. Appl. No. 15/620,916.
Notice of Allowance dated Jun. 27, 2019 in U.S. Appl. No. 15/854,439.
Office Action dated Aug. 23, 2019 in U.S. Appl. No. 15/854,409.
Office Action dated Aug. 6, 2019 in Japanese Application No. 2016-254421.
Office Action dated Aug. 6, 2019 in Japanese Application No. 2016-254427.
Office Action dated Jul. 16, 2019 in Japanese Application No. 2016-124933.
Office Action dated Apr. 26, 2017 which issued during the prosecution of U.S. Appl. No. 15/388,864.
Office Action dated Aug. 10, 2017, which issued during the prosecution of U.S. Appl. No. 14/870,618.
Office Action dated Aug. 3, 2018 which issued during the prosecution of U.S. Appl. No. 15/388,911.
Office Action dated Feb. 4, 2016 which issued during the prosecution of U.S. Appl. No. 14/753,227.
Office Action dated Jun. 7, 2018 which issued during the prosecution of U.S. Appl. No. 15/380,309.
Office Action dated May 2, 2018, which issued during the prosecution of U.S. Appl. No. 15/280,195.
Office Action dated May 4, 2018, which issued during the prosecution of U.S. Appl. No. 15/422,944.
Office Action dated May 4, 2018, which issued during the prosecution of U.S. Appl. No. 15/625,428.
Office Action dated May 7, 2018, which issued during the prosecution of U.S. Appl. No. 15/624,792.
Office Action dated May 7, 2018, which issued during the prosecution of U.S. Appl. No. 15/624,897.
Office Action dated May 7, 2018, which issued during the prosecution of U.S. Appl. No. 15/626,832.
Office Action dated Nov. 16, 2016 which issued during the prosecution of U.S. Appl. No. 15/072,550.
Office Action dated Oct. 12, 2018, which issued during the prosecution of U.S. Appl. No. 15/626,355.
Office Action dated Oct. 12, 2018, which issued during the prosecution of U.S. Appl. No. 15/627,696.
Office Action dated Oct. 15, 2018, which issued during the prosecution of U.S. Appl. No. 15/619,012.
Office Action dated Oct. 22, 2018, which issued during the prosecution of U.S. Appl. No. 15/854,439.
Office Action dated Oct. 9, 2018, which issued during the prosecution of U.S. Appl. No. 15/628,814.
Office Action dated Sep. 24, 2018, which issued during the prosecution of U.S. Appl. No. 15/690,400.
Office Action dated Sep. 27, 2018, which issued during the prosecution of U.S. Appl. No. 15/690,906.
Office Action dated Sep. 27, 2018, which issued during the prosecution of U.S. Appl. No. 15/854,383.
Office Action dated Aug. 23, 2018 from the United States Patent and Trademark Office in U.S. Appl. No. 15/614,876.
Office Action dated Aug. 23, 2018 from the United States Patent and Trademark Office in U.S. Appl. No. 15/621,464.
Office Action dated Aug. 23, 2018 from the United States Patent and Trademark Office in U.S. Appl. No. 15/626,720.
Office Action dated Aug. 24, 2018 from the United States Patent and Trademark Office in U.S. Appl. No. 15/620,916.
Office Action dated Aug. 3, 2018 from the United States Patent and Trademark Office in U.S. Appl. No. 15/380,336.
Office Action dated Dec. 5, 2016 from the United States Patent and Trademark Office in U.S. Appl. No. 14/978,834.
Office Action dated Dec. 6, 2016 from the United States Patent and Trademark Office in U.S. Appl. No. 14/757,555.
Office Action dated Jun. 9, 2017 which issued during the prosecution of U.S. Appl. No. 15/388,864.
Office Action dated May 30, 2018 which issued during the prosecution of U.S. Appl. No. 15/388,911.
Office Action dated Nov. 18, 2016 which issued during the prosecution of U.S. Appl. No. 14/753,227.
Office Action dated Aug. 15, 2016 which issued during the prosecution of U.S. Appl. No. 14/753,227.
"Introduction to TMR Magnetic Sensors", Anonymous, Mar. 12, 2015, MR Sensor Technology, pp. 1-4 (Year: 2015).
Notice of Allowance dated Apr. 25, 2017 which issued during the prosecution of U.S. Appl. No. 15/072,550.
Notice of Allowance dated Apr. 27, 2017, which issued during the prosecution of U.S. Appl. No. 15/052,115.
Notice of Allowance dated Apr. 5, 2018, which issued during the prosecution of U.S. Appl. No. 14/867,752.
Notice of Allowance dated Aug. 28, 2018 from the US Patent & Trademark Office in U.S. Appl. No. 15/422,821.
Notice of Allowance dated Aug. 30, 2017, which issued during the prosecution of U.S. Appl. No. 15/466,143.
Notice of Allowance dated Aug. 6, 2018, which issued during the prosecution of U.S. Appl. No. 15/920,768.
Notice of Allowance dated Aug. 9, 2018, which issued during the prosecution of U.S. Appl. No. 15/920,563.
Notice of Allowance dated Dec. 2, 2016 which issued during the prosecution of U.S. Appl. No. 14/753,227.
Notice of Allowance dated Dec. 3, 2018, which issued during the prosecution of U.S. Appl. No. 15/920,518.
Notice of Allowance dated Dec. 4, 2018, which issued during the prosecution of U.S. Appl. No. 15/625,428.
Notice of Allowance dated Feb. 14, 2018, which issued during the prosecution of U.S. Appl. No. 14/870,618.

(56) References Cited

OTHER PUBLICATIONS

Notice of Allowance dated Jul. 12, 2017 which issued during the prosecution of U.S. Appl. No. 15/388,864.
Notice of Allowance dated Jul. 13, 2018, which issued during the prosecution of U.S. Appl. No. 15/920,782.
Notice of Allowance dated Jun. 2, 2017, which issued during the prosecution of U.S. Appl. No. 15/218,190.
Notice of Allowance dated Jun. 28, 2017, which issued during the prosecution of U.S. Appl. No. 15/464,991.
Notice of Allowance dated Mar. 14, 2018, which issued during the prosecution of U.S. Appl. No. 15/854,474.
Notice of Allowance dated Mar. 16, 2018 which issued during the prosecution of U.S. Appl. No. 15/854,410.
Notice of Allowance dated Mar. 19, 2018, which issued during the prosecution of U.S. Appl. No. 15/378,907.
Notice of Allowance dated Mar. 21, 2018, which issued during the prosecution of U.S. Appl. No. 15/241,286.
Notice of Allowance dated Mar. 21, 2018, which issued during the prosecution of U.S. Appl. No. 15/241,297.
Notice of Allowance dated Mar. 27, 2018, which issued during the prosecution of U.S. Appl. No. 15/241,631.
Notice of Allowance dated May 10, 2018 which issued during the prosecution of U.S. Appl. No. 15/615,871.
Notice of Allowance dated May 8, 2017, which issued during the prosecution of U.S. Appl. No. 14/757,555.
Notice of Allowance dated May 8, 2017, which issued during the prosecution of U.S. Appl. No. 14/978,834.
Notice of Allowance dated Oct. 11, 2018, which issued during the prosecution of U.S. Appl. No. 15/380,336.
Notice of Allowance dated Oct. 11, 2018, which issued during the prosecution of U.S. Appl. No. 15/422,944.
Notice of Allowance dated Oct. 11, 2018, which issued during the prosecution of U.S. Appl. No. 15/624,792.
Notice of Allowance dated Oct. 11, 2018, which issued during the prosecution of U.S. Appl. No. 15/624,897.
Notice of Allowance dated Oct. 12, 2018, which issued during the prosecution of U.S. Appl. No. 15/626,832.
Notice of Allowance dated Oct. 6, 2016, which issued during the prosecution of U.S. Appl. No. 14/209,065.
Notice of Allowance dated Sep. 24, 2018, which issued during the prosecution of U.S. Appl. No. 15/854,438.
Notice of Allowance dated Sep. 4, 2018, which issued during the prosecution of U.S. Appl. No. 15/625,428.
Notice of Allowance dated Apr. 16, 2019 in U.S. Appl. No. 15/625,428.
Notice of Allowance dated Apr. 30, 2019 in U.S. Appl. No. 15/380,309.
Notice of Allowance dated Aug. 27, 2018 in U.S. Appl. No. 15/920,635.
Notice of Allowance dated Jan. 10, 2019 in U.S. Appl. No. 15/848,173.
Notice of Allowance dated Jan. 17, 2019 in U.S. Appl. No. 15/422,944.
Notice of Allowance dated Jan. 17, 2019 in U.S. Appl. No. 15/626,720.
Notice of Allowance dated Jan. 30, 2019 in U.S. Appl. No. 15/854,409.
Notice of Allowance dated Mar. 13, 2019 in U.S. Appl. No. 16/100,289.
Notice of Allowance dated Mar. 18, 2019 in U.S. Appl. No. 15/626,355.
Notice of Allowance dated Mar. 18, 2019 in U.S. Appl. No. 15/628,814.
Notice of Allowance dated May 13, 2019 in U.S. Appl. No. 15/900,379.
Notice of Allowance dated May 14, 2019 in U.S. Appl. No. 15/422,821.
Notice of Allowance dated May 14, 2019 in U.S. Appl. No. 15/900,164.
Notice of Allowance dated May 15, 2019 in U.S. Appl. No. 15/900,106.
Notice of Allowance dated May 15, 2019 in U.S. Appl. No. 15/900,242.
Notice of Allowance dated May 16, 2019 in U.S. Appl. No. 15/614,876.
Notice of Allowance dated May 16, 2019 in U.S. Appl. No. 15/621,464.
Office Action dated Apr. 19, 2018, which issued during the prosecution of U.S. Appl. No. 15/854,438.
Office Action dated Dec. 14, 2018, which issued during the prosecution of U.S. Appl. No. 15/920,517.
Office Action dated Dec. 17, 2018, which issued during the prosecution of U.S. Appl. No. 15/920,515.
Office Action dated Dec. 17, 2018, which issued during the prosecution of U.S. Appl. No. 15/920,533.
Office Action dated Dec. 17, 2018, which issued during the prosecution of U.S. Appl. No. 15/920,538.
Office Action dated Dec. 17, 2018, which issued during the prosecution of U.S. Appl. No. 15/920,544.
Office Action dated Dec. 20, 2018, which issued during the prosecution of U.S. Appl. No. 15/900,164.
Office Action dated Dec. 21, 2018, which issued during the prosecution of U.S. Appl. No. 15/900,230.
Office Action dated Feb. 25, 2016, which issued during the prosecution of U.S. Appl. No. 14/867,752.
Office Action dated Jan. 27, 2015 from the Japanese Patent Office in Japanese Application No. 2013-053543.
Office Action dated Jan. 31, 2018, which issued during the prosecution of U.S. Appl. No. 14/867,752.
Office Action dated Jul. 3, 2018, which issued during the prosecution of U.S. Appl. No. 15/920,518.
Office Action dated Feb. 28, 2019 in U.S. Appl. No. 15/920,518.
Office Action dated Jul. 6, 2015, which issued during the prosecution of U.S. Appl. No. 14/209,065.
Office Action dated Jul. 6, 2018 from the United States Patent and Trademark Office in U.S. Appl. No. 15/848,173.
Office Action dated Mar. 13, 2015, which issued during the prosecution of U.S. Appl. No. 14/209,065.
Office Action dated Mar. 16, 2017, which issued during the prosecution of U.S. Appl. No. 14/867,752.
Office Action dated Mar. 24, 2016, which issued during the prosecution of U.S. Appl. No. 14/209,065.
Office Action dated May 4, 2018 which issued during the prosecution of U.S. Appl. No. 15/422,821.
Office Action dated Nov. 28, 2018, which issued during the prosecution of U.S. Appl. No. 15/899,587.
Office Action dated Nov. 28, 2018, which issued during the prosecution of U.S. Appl. No. 15/900,080.
Office Action dated Nov. 28, 2018, which issued during the prosecution of U.S. Appl. No. 15/900,144.
Office Action dated Nov. 29, 2018, which issued during the prosecution of U.S. Appl. No. 15/380,309.
Office Action dated Nov. 29, 2018, which issued during the prosecution of U.S. Appl. No. 15/422,821.
Office Action dated Nov. 8, 2016 from the Japanese Patent Office in Japanese Application No. 2014-199022.
Office Action dated Oct. 15, 2018, which issued during the prosecution of U.S. Appl. No. 15/854,403.
Office Action dated Oct. 19, 2016, which issued during the prosecution of U.S. Appl. No. 14/867,752.
Office Action dated Oct. 3, 2018 from the United States Patent and Trademark Office in U.S. Appl. No. 15/280,195.
Office Action dated Oct. 5, 2017, which issued during the prosecution of U.S. Appl. No. 15/241,286.
Office Action dated Oct. 5, 2017, which issued during the prosecution of U.S. Appl. No. 15/241,297.
Office Action dated Oct. 5, 2017, which issued during the prosecution of U.S. Appl. No. 15/241,631.
Office Action dated Oct. 5, 2017, which issued during the prosecution of U.S. Appl. No. 15/378,907.
Office Action dated Sep. 10, 2015, which issued during the prosecution of U.S. Appl. No. 14/209,065.
Office Action dated Sep. 19, 2014, which issued during the prosecution of U.S. Appl. No. 14/209,065.
Office Action dated Sep. 26, 2017 issued by the Japanese Patent Office in JP Appln. No. 2014-265723.

(56) References Cited

OTHER PUBLICATIONS

Office Action dated Sep. 26, 2017 issued by the Japanese Patent Office in JP Appln. No. 2015-249264.
Office Action dated Sep. 28, 2018, which issued during the prosecution of U.S. Appl. No. 15/854,409.
Office Action dated Sep. 7, 2017, which issued during the prosecution of U.S. Appl. No. 14/867,752.
Office Action dated Apr. 15, 2019 in U.S. Appl. No. 16/182,083.
Office Action dated Apr. 16, 2019 in U.S. Appl. No. 16/232,165.
Office Action dated Apr. 23, 2019 in Japanese Application No. 2016-169851 Translation.
Office Action dated Apr. 23, 2019 in Japanese Application No. 2016-182230.
Office Action dated Apr. 4, 2019 in U.S. Appl. No. 16/184,312.
Office Action dated Dec. 19, 2018 in U.S. Appl. No. 15/900,345.
Office Action dated Dec. 19, 2018 in U.S. Appl. No. 15/900,379.
Office Action dated Dec. 20, 2018 in U.S. Appl. No. 15/900,106.
Office Action dated Dec. 20, 2018 in U.S. Appl. No. 15/900,242.
Office Action dated Dec. 21, 2018 in U.S. Appl. No. 15/900,160.
Office Action dated Dec. 21, 2018 in U.S. Appl. No. 15/920,616.
Office Action dated Dec. 25, 2018 in Japanese Application No. 2015-245144.
Office Action dated Dec. 25, 2018 in Japanese Application No. 2015-245145.
Office Action dated Dec. 25, 2018 in Japanese Application No. 2015-254192.
Office Action dated Dec. 27, 2018 in U.S. Appl. No. 15/900,334.
Office Action dated Dec. 31, 2018 in U.S. Appl. No. 16/009,603.
Office Action dated Dec. 7, 2018 in U.S. Appl. No. 15/920,592.
Office Action dated Feb. 21, 2019 in U.S. Appl. No. 15/854,383.
Office Action dated Feb. 26, 2019 in Japanese Application No. 2016-123207.
Office Action dated Feb. 26, 2019 in U.S. Appl. No. 15/380,336.
Office Action dated Feb. 26, 2019 in U.S. Appl. No. 15/624,792.
Office Action dated Feb. 26, 2019 in U.S. Appl. No. 15/624,897.
Office Action dated Feb. 26, 2019 in U.S. Appl. No. 15/626,832.
Office Action dated Feb. 5, 2019 in Japanese Application No. 2016-117339.
Office Action dated Feb. 5, 2019 in Japanese Application No. 2016-123205.
Office Action dated Feb. 5, 2019 in Japanese Application No. 2016-169871.
Office Action dated Feb. 5, 2019 in U.S. Appl. No. 16/038,339.
Office Action dated Feb. 7, 2019 in U.S. Appl. No. 15/621,464.
Office Action dated Jan. 10, 2019 in U.S. Appl. No. 15/899,430.
Office Action dated Jan. 29, 2019 in U.S. Appl. No. 15/614,876.
Office Action dated Jan. 30, 2019 in U.S. Appl. No. 15/620,916.
Office Action dated Mar. 15, 2019 in U.S. Appl. No. 15/280,195.
Office Action dated Mar. 15, 2019 in U.S. Appl. No. 15/619,012.
Office Action dated Mar. 15, 2019 in U.S. Appl. No. 15/627,696.
Office Action dated Mar. 15, 2019 in U.S. Appl. No. 15/690,906.
Office Action dated Mar. 19, 2019 in Japanese Application No. 2016-116261.
Office Action dated Mar. 19, 2019 in Japanese Application No. 2016-124515.
Office Action dated Mar. 19, 2019 in Japanese Application No. 2016-124529.
Office Action dated Mar. 19, 2019 in Japanese Application No. 2016-124932.
Office Action dated Mar. 19, 2019 in Japanese Application No. 2016-124933.
Office Action dated Mar. 19, 2019 in Japanese Application No. 2016-124935.
Office Action dated Mar. 18, 2019 in U.S. Appl. No. 15/442,961.
Office Action dated Mar. 21, 2019 in U.S. Appl. No. 15/900,144.
Office Action dated Mar. 21, 2019 in U.S. Appl. No. 16/160,377.
Office Action dated Mar. 27, 2019 in U.S. Appl. No. 15/690,400.
Office Action dated Mar. 6, 2019 in U.S. Appl. No. 15/854,403.
Office Action dated Mar. 7, 2019 in U.S. Appl. No. 15/854,439.
Office Action dated Nov. 14, 2018 in U.S. Appl. No. 16/100,289.
Office Action dated Nov. 19, 2018 in U.S. Appl. No. 15/900,141.
Notice of Allowance dated Mar. 5, 2019 in U.S. Appl. No. 16/009,603.
Office Action dated May 23, 2019 in U.S. Appl. No. 15/388,911.
Notice of Allowance dated May 24, 2019 in U.S. Appl. No. 16/143,646.
Notice of Allowance dated May 24, 2019 in U.S. Appl. No. 15/900,345.
Notice of Allowance dated May 28, 2019 in U.S. Appl. No. 15/920,616.
Notice of Allowance dated May 29, 2019 in U.S. Appl. No. 15/900,334.
Notice of Allowance dated May 29, 2019 in U.S. Appl. No. 15/900,160.
Notice of Allowance dated May 30, 2019 in U.S. Appl. No. 15/900,230.
Notice of Allowance dated Jun. 6, 2019 in U.S. Appl. No. 15/854,383.
Office Action dated Jun. 6, 2019 in U.S. Appl. No. 15/899,587.
Office Action dated Jun. 10, 2019 in U.S. Appl. No. 15/920,518.
Office Action dated Mar. 5, 2019 in U.S. Appl. No. 15/443,026.
Advisory Action dated Jul. 5, 2018 in U.S. Appl. No. 14/838,663.
Office Action dated Aug. 25, 2017 in U.S. Appl. No. 14/838,663.
Office Action dated Feb. 11, 2016 in U.S. Appl. No. 14/838,663.
Office Action dated Mar. 15, 2018 in U.S. Appl. No. 14/838,663.
Office Action dated Mar. 30, 2017 in U.S. Appl. No. 14/838,663.
Office Action dated Sep. 12, 2016 in U.S. Appl. No. 14/838,663.
Notice of Allowance dated Mar. 18, 2020 in U.S. Appl. No. 16/037,564.
Office Action dated Mar. 10, 2020 in U.S. Appl. No. 16/037,573.
Office Action dated Mar. 13, 2020 in U.S. Appl. No. 16/038,669.
Office Action dated Mar. 13, 2020 in U.S. Appl. No. 16/144,605.
U.S. Appl. No. 15/052,115, Patented as U.S. Pat. No. 9,704,527.
U.S. Appl. No. 15/218,190, Patented as U.S. Pat. No. 9,721,606.
U.S. Appl. No. 15/280,195, Patented as U.S. Pat. No. 10,540,996.
U.S. Appl. No. 15/422,821, Patented as U.S. Pat. No. 10,475,481.
U.S. Appl. No. 15/422,944, Patented as U.S. Pat. No. 10,347,279.
U.S. Appl. No. 15/466,143, Patented as U.S. Pat. No. 9,837,116.
U.S. Appl. No. 15/619,012, Patented as U.S. Pat. No. 10,515,660.
U.S. Appl. No. 15/624,897, Patented as U.S. Pat. No. 10,510,368.
U.S. Appl. No. 15/624,792, Patented as U.S. Pat. No. 10,497,388.
U.S. Appl. No. 15/626,832, Patented as U.S. Pat. No. 10,510,370.
U.S. Appl. No. 15/625,428, Patented as U.S. Pat. No. 10,403,318.
U.S. Appl. No. 14/978,834, Patented as U.S. Pat. No. 9,721,605.
U.S. Appl. No. 14/757,555, Patented as U.S. Pat. No. 9,711,174.
U.S. Appl. No. 15/197,046, Patented as U.S. Pat. No. 9,721,607.
U.S. Appl. No. 15/380,336, Patented as U.S. Pat. No. 10,522,180.
U.S. Appl. No. 15/614,876, Patented as U.S. Pat. No. 10,431,248.
U.S. Appl. No. 15/620,916, Patented as U.S. Pat. No. 10,477,072.
U.S. Appl. No. 15/621,464, Patented as U.S. Pat. No. 10,431,249.
U.S. Appl. No. 15/626,720, Patented as U.S. Pat. No. 10,347,280.
U.S. Appl. No. 15/854,383, Patented as U.S. Pat. No. 10,438,628.
U.S. Appl. No. 15/854,507, Patented as U.S. Pat. No. 9,984,716.
U.S. Appl. No. 15/854,439, Patented as U.S. Pat. No. 10,482,915.
U.S. Appl. No. 15/854,506, Patented as U.S. Pat. No. 10,008,230.
U.S. Appl. No. 15/848,173, Patented as U.S. Pat. No. 10,403,320.
U.S. Appl. No. 15/628,814, Patented as U.S. Pat. No. 10,504,546.
U.S. Appl. No. 15/690,400, Patented as U.S. Pat. No. 10,529,368.
U.S. Appl. No. 15/690,906, Patented as U.S. Pat. No. 10,522,179.
U.S. Appl. No. 15/626,355, Patented as U.S. Pat. No. 10,510,369.
U.S. Appl. No. 15/627,696, Patented as U.S. Pat. No. 10,522,171.
U.S. Appl. No. 14/870,618, Patented as U.S. Pat. No. 9,959,894.
U.S. Appl. No. 15/388,911, Patented as U.S. Pat. No. 10,573,341.
U.S. Appl. No. 14/753,227, Patented as U.S. Pat. No. 9,601,146.
U.S. Appl. No. 15/380,309, Patented as U.S. Pat. No. 10,403,319.
U.S. Appl. No. 15/388,864, Patented as U.S. Pat. No. 9,773,519.
U.S. Appl. No. 15/072,550, Patented as U.S. Pat. No. 9,704,525.
U.S. Appl. No. 15/615,871, Patented as U.S. Pat. No. 10,074,393.
U.S. Appl. No. 15/854,410, Patented as U.S. Pat. No. 9,972,351.
U.S. Appl. No. 15/378,907, Patented as U.S. Pat. No. 9,984,710.
U.S. Appl. No. 15/241,631, Patented as U.S. Pat. No. 10,026,435.
U.S. Appl. No. 14/209,065, Patented as U.S. Pat. No. 9,530,444.
U.S. Appl. No. 15/854,474, Patented as U.S. Pat. No. 9,978,414.
U.S. Appl. No. 15/854,403, Pending.
U.S. Appl. No. 15/241,297, Patented as U.S. Pat. No. 10,026,434.

(56) References Cited

OTHER PUBLICATIONS

U.S. Appl. No. 15/241,286, Patented as U.S. Pat. No. 10,026,4331.
U.S. Appl. No. 15/464,991, Patented as U.S. Pat. No. 9,779,772.
U.S. Appl. No. 14/867,752, Patented as U.S. Pat. No. 10,026,430.
U.S. Appl. No. 15/854,438, Patented as U.S. Pat. No. 10,373,633.
U.S. Appl. No. 15/854,409, Abandoned.
U.S. Appl. No. 15/443,026, Pending.
U.S. Appl. No. 15/920,782, Patented as U.S. Pat. No. 10,134,433.
U.S. Appl. No. 15/920,563, Patented as U.S. Pat. No. 10,360,937.
U.S. Appl. No. 15/920,533, Patented as U.S. Pat. No. 10,431,251.
U.S. Appl. No. 15/900,144, Patented as U.S. Pat. No. 10,497,384.
U.S. Appl. No. 15/900,080, Patented as U.S. Pat. No. 10,460,756.
U.S. Appl. No. 15/900,230, Patented as U.S. Pat. No. 10,431,250.
U.S. Appl. No. 15/900,164, Patented as U.S. Pat. No. 10,424,330.
U.S. Appl. No. 15/920,518, Patented as U.S. Pat. No. 10,546,605.
U.S. Appl. No. 15/899,587, Patented as U.S. Pat. No. 10,546,602.
U.S. Appl. No. 15/899,430, Patented as U.S. Pat. No. 10,403,314.
U.S. Appl. No. 15/920,515, Patented as U.S. Pat. No. 10,410,665.
U.S. Appl. No. 15/920,517, Patented as U.S. Pat. No. 10,395,685.
U.S. Appl. No. 15/920,538, Patented as U.S. Pat. No. 10,403,317.
U.S. Appl. No. 15/920,544, Patented as U.S. Pat. No. 10,410,666.
U.S. Appl. No. 15/920,768, Patented as U.S. Pat. No. 10,373,639.
U.S. Appl. No. 16/009,603, Patented as U.S. Pat. No. 10,366,721.
U.S. Appl. No. 16/182,083, Patented as U.S. Pat. No. 10,515,661.
U.S. Appl. No. 15/705,531, Allowed.
U.S. Appl. No. 16/232,165, Patented as U.S. Pat. No. 10,510,366.
U.S. Appl. No. 16/100,289, Patented as U.S. Pat. No. 10,497,389.
U.S. Appl. No. 16/038,669, Pending.
U.S. Appl. No. 15/900,106, Patented as U.S. Pat. No. 10,438,624.
U.S. Appl. No. 15/900,412, Patented as U.S. Pat. No. 10,062,403.
U.S. Appl. No. 15/900,141, Patented as U.S. Pat. No. 10,573,338.
U.S. Appl. No. 15/900,160, Patented as U.S. Pat. No. 10,438,625.
U.S. Appl. No. 15/900,345, Patented as U.S. Pat. No. 10,482,913.
U.S. Appl. No. 15/900,379, Patented as U.S. Pat. No. 10,453,488.
U.S. Appl. No. 16/012,018, Pending.
U.S. Appl. No. 15/920,616, Patented as U.S. Pat. No. 10,438,623.
U.S. Appl. No. 15/900,242, Patented as U.S. Pat. No. 10,475,480.
U.S. Appl. No. 15/900,334, Patented as U.S. Pat. No. 10,438,621.
U.S. Appl. No. 15/920,592, Patented as U.S. Pat. No. 10,403,312.
U.S. Appl. No. 15/920,635, Patented as U.S. Pat. No. 10,170,144.
U.S. Appl. No. 16/160,377, Patented as U.S. Pat. No. 10,490,220.
U.S. Appl. No. 15/442,961, Pending.
U.S. Appl. No. 16/038,687, Pending.
U.S. Appl. No. 16/038,514, Pending.
U.S. Appl. No. 16/038,545, Pending.
U.S. Appl. No. 16/037,596, Pending.
U.S. Appl. No. 16/038,771, Pending.
U.S. Appl. No. 16/037,564, Pending.
U.S. Appl. No. 16/038,339, Patented as U.S. Pat. No. 10,403,316.
U.S. Appl. No. 16/037,573, Pending.
U.S. Appl. No. 16/037,681, Pending.
U.S. Appl. No. 16/038,884, Pending.
U.S. Appl. No. 16/038,847, Pending.
U.S. Appl. No. 16/044,574, Patented as U.S. Pat. No. 10,438,622.
U.S. Appl. No. 16/142,560, Pending.
U.S. Appl. No. 16/184,312, Patented as U.S. Pat. No. 10,497,386.
U.S. Appl. No. 16/143,646, Patented as U.S. Pat. No. 10,515,657.
U.S. Appl. No. 16/144,428, Pending.
U.S. Appl. No. 16/143,747, Pending.
U.S. Appl. No. 16/440,161, Allowed.
U.S. Appl. No. 16/144,605, Pending.
U.S. Appl. No. 15/854,397, Abandoned.
U.S. Appl. No. 15/854,329, Patented as U.S. Pat. No. 9,984,712.
U.S. Appl. No. 14/838,663, Abandoned.
Notice of Allowance dated Feb. 20, 2020 in U.S. Appl. No. 15/705,531.
Notice of Allowance dated Feb. 7, 2020 in U.S. Appl. No. 16/440,161.
Office Action dated Mar. 10, 2020 in U.S. Appl. No. 16/037,596.
Office Action dated Mar. 10, 2020 in U.S. Appl. No. 16/037,681.
Office Action dated Mar. 10, 2020 in U.S. Appl. No. 16/038,545.
Office Action dated Mar. 10, 2020 in U.S. Appl. No. 16/038,687.
Office Action dated Mar. 10, 2020 in U.S. Appl. No. 16/038,771.
Office Action dated Mar. 10, 2020 in U.S. Appl. No. 16/038,847.
Office Action dated Mar. 10, 2020 in U.S. Appl. No. 16/038,884.
Office Action dated Mar. 10, 2020 in U.S. Appl. No. 16/142,560.
Office Action dated Mar. 10, 2020 in U.S. Appl. No. 16/143,747.
Office Action dated Mar. 10, 2020 in U.S. Appl. No. 16/144,428.
Office Action dated Feb. 21, 2020 in U.S. Appl. No. 16/038,514.
Office action dated Jan. 28, 2020 in U.S. Appl. No. 15/442,961.
Notice of Allowance dated Aug. 3, 2020 in U.S. Appl. No. 16/038,847.
Notice of Allowance dated Aug. 3, 2020 in U.S. Appl. No. 16/038,884.
Notice of Allowance dated Jul. 23, 2020 in U.S. Appl. No. 16/037,573.
Notice of Allowance dated Jul. 23, 2020 in U.S. Appl. No. 16/038,669.
Notice of Allowance dated Jul. 24, 2020 in U.S. Appl. No. 16/037,596.
Notice of Allowance dated Jul. 27, 2020 in U.S. Appl. No. 16/038,771.
Notice of Allowance dated Jul. 29, 2020 in U.S. Appl. No. 16/037,681.
Notice of Allowance dated Jul. 29, 2020 in U.S. Appl. No. 16/142,560.
Notice of Allowance dated Jul. 29, 2020 in U.S. Appl. No. 16/144,428.
Notice of Allowance dated Jul. 29, 2020 in U.S. Appl. No. 16/144,605.
Notice of Allowance dated Jul. 30, 2020 in U.S. Appl. No. 16/038,545.
Notice of Allowance dated Jul. 30, 2020 in U.S. Appl. No. 16/038,687.
Notice of Allowance dated May 7, 2020 in U.S. Appl. No. 16/038,514.
Office Action dated Apr. 29, 2020 in U.S. Appl. No. 16/012,018.
Office Action dated Jul. 8, 2020 in U.S. Appl. No. 15/442,961.
Notice of Allowance dated Aug. 17, 2020 in U.S. Appl. No. 15/443,026.
Office Action dated Mar. 31, 2020 in U.S. Appl. No. 15/443,026.
Office Action dated Aug. 25, 2020 in Chinese Application No. 201711439496.2.
Notice of Allowance dated Sep. 17, 2020 in U.S. Appl. No. 16/012,018.
Notice of Allowance dated Nov. 13, 2020 in U.S. Appl. No. 15/442,961.

* cited by examiner

MAGNETIC TAPE

CROSS-REFERENCE TO RELATED APPLICATIONS

This application claims priority under 35 U.S.C 119 to Japanese Patent Application No. 2016-037574 filed on Feb. 29, 2016. The above application is hereby expressly incorporated by reference, in its entirety.

BACKGROUND OF THE INVENTION

Field of the Invention

The present invention relates to a magnetic tape.

Discussion of the Background

Magnetic recording media include tape-shaped media and disk-shaped media. Magnetic recording media in the form of tapes, that is, magnetic tapes, are primarily employed in data storage applications such as data backup.

Japanese Unexamined Patent Publication (KOKAI) No. 2009-283082, which is expressly incorporated herein by reference in its entirety, discloses a magnetic tape having a backcoat layer on the opposite surface of a nonmagnetic support from that on which a magnetic layer is present. Japanese Unexamined Patent Publication (KOKAI) No. 2009-283082 discloses that the magnetic tape contains a lubricant in the backcoat layer.

SUMMARY OF THE INVENTION

A magnetic tape can be housed wound up on a reel within a magnetic tape cartridge. To increase the recording capacity per magnetic tape cartridge, it is better to increase the overall length of the magnetic tape that is housed per cartridge. To that end, it is desirable to reduce the thickness (also referred to as "thickness reduction" hereinafter) of the magnetic tape.

One way of thickness reduction of a magnetic tape is to reduce the thickness of the backcoat layer. As regards the thickness of the backcoat layer, a backcoat layer that is 0.5 μm in thickness is formed in Examples in Japanese Unexamined Patent Publication (KOKAI) No. 2009-283082. However, to achieve the even higher recording capacities that have been demanded in recent years, it is desirable to further reduce the thickness of the backcoat layer (referred to as "thickness reduction" hereinafter).

The recording and reproduction of signals on a magnetic tape are generally conducted by loading a magnetic tape cartridge into a drive and causing the magnetic tape to run within the drive. Normally, during such running, the backcoat layer comes into contact with components of the drive, such as rollers that feed out and/or wind up the magnetic tape within the drive. It is presumed here that when suitable affinity exists between the surface of the backcoat layer and the components of the drive, it is possible to stabilize running (enhance running stability) of the magnetic tape within the drive. In this regard, the present inventors presume that incorporating lubricant into the backcoat layer, for example, as is described in Japanese Unexamined Patent Publication (KOKAI) No. 2009-283082 can contribute to enhancing running stability by controlling the affinity of the surface of the backcoat layer and the components of the drive. Further, when the present inventors examined further reducing the thickness of the backcoat layer than the backcoat layer formed in Examples of Japanese Unexamined Patent Publication (KOKAI) No. 2009-283082, they found that simply incorporating lubricant into the backcoat layer did not readily inhibit the drop in running stability of a magnetic tape having a backcoat layer of reduced thickness.

An aspect of the present invention provides for a magnetic tape that has a backcoat layer of reduced thickness and is capable of exhibiting good running stability.

An aspect of the present invention relates to:

A magnetic tape having a magnetic layer containing ferromagnetic powder and binder on one surface of a nonmagnetic support and having a backcoat layer containing nonmagnetic powder and binder on the other surface thereof, wherein:

the thickness of the backcoat layer is less than or equal to 0.20 μm; and the contact angle for 1-bromonaphthalene that is measured on the surface of the backcoat layer falls within a range of 10.0° to 30.0°.

The above magnetic tape can exhibit good running stability despite having a backcoat layer with a reduced thickness of less than or equal to 0.20 μm. The presumptions of the present inventors in this regard are set forth further below.

The "contact angle for 1-bromonaphthalene" is also referred to as the "1-bromonaphthalene contact angle" below. The 1-bromonaphthalene contact angle is evaluated by the drop method. Specifically, the "contact angle" refers to the arithmetic average of values obtained by conducting six measurements of a given sample by the θ/2 method in a measurement environment of an atmospheric temperature of 25° C. and 25% relative humidity. Examples of specific measurement conditions will be set forth further below in Examples.

In one embodiment, the thickness of the backcoat layer falls within a range of 0.05 μm to 0.20 μm.

In one embodiment, the backcoat layer further contains a nitrogen-containing polymer. In the present invention and the present specification, the term "polymer" is used to mean a polymer comprised of a plurality of identical or different repeating units, and includes homopolymers and copolymers.

In one embodiment, the above nitrogen-containing polymer is a polyalkyleneimine polymer.

In one embodiment, the above polyalkyleneimine polymer is a polymer containing a polyalkyleneimine chain and a polyester chain.

In one embodiment, the backcoat layer further contains one or more lubricants selected from the group consisting of fatty acids, fatty acid esters, and fatty acid amides.

In one embodiment, the contact angle for 1-bromonaphthalene that is measured on the surface of the backcoat layer falls within a range of 15.0° to 27.0°.

In one embodiment, the contact angle for 1-bromonaphthalene that is measured on the surface of the backcoat layer falls within a range of 18.0° to 25.0°.

In one embodiment, the nonmagnetic powder contained in the backcoat layer is selected from the group consisting of inorganic powder and carbon black. The term "nonmagnetic powder" means a collection of multiple nonmagnetic particles. The term "collection" is not limited to forms where the constituent particles are in direct contact, but includes forms in which binder and/or additives and the like are present between the particles. The term "particles" is also sometimes used to denote powder. The above also hold true for the various powders in the present invention and present specification.

In one embodiment, the nonmagnetic powder contained in the backcoat layer contains at least carbon black.

In one embodiment, a nonmagnetic layer containing nonmagnetic powder and binder is further present between the nonmagnetic support and the magnetic layer.

An aspect of the present invention can provide a magnetic tape having a backcoat layer with a thickness of less than or equal to 0.20 µm and exhibiting good running stability.

Other exemplary embodiments and advantages of the present invention may be ascertained by reviewing the present disclosure.

DETAILED DESCRIPTION OF THE EMBODIMENTS

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description making apparent to those skilled in the art how several forms of the present invention may be embodied in practice.

The magnetic tape of an aspect of the present invention is a magnetic tape having a magnetic layer containing ferromagnetic powder and binder on one surface of a nonmagnetic support and having a backcoat layer containing nonmagnetic powder and binder on the other surface thereof, wherein the thickness of the backcoat layer is less than or equal to 0.20 µm and the contact angle for 1-bromonaphthalene (1-bromonaphthalene contact angle) that is measured on the surface of the backcoat layer falls within a range of 10.0° to 30.0°.

Although not limiting the present invention in any way, the present inventors presume the following to be the reasons for the above magnetic tape being able to exhibit good running durability despite having a backcoat layer with a reduced thickness of less than or equal to 0.20 µm.

In the course of conducting extensive research, the present inventors focused on the contact angle for 1-bromonaphthalene (1-bromonaphthalene contact angle). A further description will be given in this regard. The present inventors presumed that the surface free energy of the surface of the backcoat layer would affect the affinity of the surface of the backcoat layer and the components of the drive, and conducted research based on the Kitazaki-Hata (three liquid method), which is a known theory relating to surface free energy. The surface free energy calculated by the three-liquid method is obtained as the sum of a dispersion component, hydrogen-bonding component, and polar component. However, due to the physical properties of the constituent components of the backcoat layer, the dispersion component is thought to be dominant in the surface free energy that is measured on the surface of the backcoat layer of a particulate magnetic tape such as the above magnetic tape. Accordingly, the dispersion component was presumed to primarily contribute to the affinity of the surface of the backcoat layer of the magnetic tape and the components of the drive. Accordingly, the present inventors conducted extensive research into controlling the surface state of the backcoat layer based on an indicator of the dispersion component. As a result, they adopted the 1-bromonaphthalene contact angle. This resulted from focusing on the fact that the dispersion component of 1-bromonaphthalene also dominated the surface free energy. The present inventors then further examined controlling the surface state of the backcoat layer based on the 1-bromonaphthalene contact angle. In this research, the following became clear.

The value of the 1-bromonaphthalene contact angle could be adjusted by adding lubricant to the backcoat layer. However, the 1-bromonaphthalene contact angle that was measured on the surface of a backcoat layer that was less than or equal to 0.20 µm in thickness could not normally be readily raised to greater than or equal to a given value by just adding lubricant. The present inventors presumed this to be due to the fact that the lubricant precipitated out when more than a certain amount of lubricant was added since less lubricant could be held in the layer than in a thicker backcoat layer. The present inventors also presumed this to be the cause of a drop in the running stability of a magnetic tape having a backcoat layer of reduced thickness.

By contrast, when the present inventors conducted further extensive research, they discovered that it was possible to control the 1-bromonaphthalene contact angle measured on the surface of a backcoat layer of less than or equal to 0.20 µm in thickness to within a range of 10.0° to 30.0° by, for example, incorporating the polymer described in detail further below into the backcoat layer. They found that a backcoat layer exhibiting a 1-bromonaphthalene contact angle falling within such a range could exhibit good running stability despite having a thickness of less than or equal to 0.20 µm.

The present invention was devised based on the above knowledge. However, the above includes presumptions by the present inventors and does not limit the present invention in any way.

The above magnetic tape will be described in greater detail below.

[1-Bromonaphthalene Contact Angle]

In the above magnetic tape, the 1-bromonaphthalene contact angle measured on the surface of the backcoat layer falls within a range of 10.0° to 30.0°. The present inventors presume that the lower the value of the 1-bromonaphthalene contact angle, the greater the affinity of the surface of the backcoat layer and the components of the drive, and the higher the value, the lesser the affinity of the surface of the backcoat layer and the components of the drive signified. It is presumed that the above magnetic tape can exhibit good running stability by exhibiting a suitable degree of affinity for the components of the drive during contact between the surface of the backcoat layer exhibiting a 1-bromonaphthalene contact angle falling within a range of 10.0° to 30.0° and components of the drive. From the perspective of further enhancing running stability, the 1-bromonaphthalene contact angle measured on the surface of the backcoat layer is desirably greater than or equal to 15.0°, preferably greater than or equal to 18.0°. From the same perspective, the 1-bromonaphthalene contact angle is desirably less than or equal to 27.0°, and preferably less than or equal to 25.0°.

The 1-bromonaphthalene contact angle that is measured on the surface of the backcoat layer can be controlled by using components capable of adjusting the 1-bromonaphthalene contact angle (also referred to as "1-bromonaphthalene contact angle-adjusting components" or "contact angle-adjusting components", hereinafter) and adjusting the contents of such components. For example, a component producing an effect of raising the 1-bromonaphthalene contact angle can be employed as a 1-bromonaphthalene contact angle-adjusting component and the content of this component can be increased to increase the value of the 1-bromonaphthalene contact angle. One example of such a component is a lubricant. However, based on research conducted by the present inventors as set forth above, it may be normally difficult to control the 1-bromonaphthalene contact angle that is measured on the surface of a backcoat layer that is less than or equal to 0.20 μm in thickness to within a range of 10.0° to 30.0° by just adding a lubricant. By contrast, the use of the polymers described in detail further below, and/or the use of such polymers in combination with a lubricant, makes it possible to control the 1-bromonaphthalene contact angle measured on the surface of a backcoat layer of less than or equal to 0.20 μm in thickness to within a range of 10.0° to 30.0°. This will be described in greater detail further below.

[Thickness of the Backcoat Layer]

The thickness of the backcoat layer of the above magnetic tape is less than or equal to 0.20 μm. The thickness of the backcoat layer can be, for example, greater than or equal to 0.05 μm, or can be greater than or equal to 0.10 μm. Reducing the thickness of the backcoat layer to less than or equal to 0.20 μm can contribute to reducing the thickness of the magnetic tape on which the backcoat layer is present. However, reducing the thickness of the backcoat layer will end up reducing running stability. By contrast, both reduction in the thickness of the backcoat layer and good running stability can be achieved by keeping the 1-bromonaphthalene contact angle that is measured on the surface of a backcoat layer of less than or equal to 0.20 μm in thickness to within a range of 10.0° to 30.0°. From the perspective of further reducing the thickness of the magnetic tape, the thickness of the backcoat layer can be less than or equal to 0.18 μm, or can be less than or equal to 0.15 μm.

[1-Bromonaphthalene Contact Angle-Adjusting Component]

The term "1-bromonaphthalene contact angle-adjusting component" refers to a component that is capable of adjusting the 1-bromonaphthalene contact angle that is measured on the surface of the backcoat layer. Here, the term "capable of adjusting" means exhibiting an effect that changes the 1-bromonaphthalene contact angle, and desirably increase the value of the 1-bromonaphthalene contact angle. The fact of exhibiting such an effect can be recognized by determining whether the presence of a 1-bromonaphthalene contact angle-adjusting component changes the 1-bromonaphthalene contact angle that is measured on the surface of the backcoat layer. One form of a 1-bromonaphthalene contact angle-adjusting component is a lubricant; other forms are polymers that will be described in detail further below. These components will be sequentially described below.

<Lubricant>

Examples of the lubricant are various lubricants commonly employed in magnetic recording media, such as fatty acids, fatty acid esters, and fatty acid amides.

Examples of fatty acids are lauric acid, myristic acid, palmitic acid, steric acid, oleic acid, linoleic acid, linolenic acid, behenic acid, erucic acid, and elaidic acid. Stearic acid, myristic acid, and palmitic acid are desirable, and stearic acid is preferred. Fatty acids can also be incorporated into the backcoat layer in the form of salts such as metal salts.

The fatty acid content of the backcoat layer is, for example, 0.1 to 10.0 weight parts, desirably 0.2 to 7.0 weight parts, per 100.0 weight parts of nonmagnetic powder. When two or more fatty acids are employed as the fatty acid, the content refers to the combined contents thereof. The same applies to other components. That is, in the present invention and present specification, unless specifically stated otherwise, one or more types of a given component can be employed. When two or more types of a given component are employed, unless specifically stated otherwise, the content of the component refers to the combined contents of the two or more types of the component.

Examples of fatty acid esters are esters of each of the above fatty acids, such as butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

The content of fatty acid ester in the backcoat layer is, for example, 0.1 to 10.0 weight parts, desirably 1.0 to 7.0 weight parts, per 100.0 weight parts of nonmagnetic powder.

Examples of fatty acid amides are amides of each of the above fatty acids, such as amide laurate, amide myristate, amide palmitate, and amide stearate.

The content of fatty acid amide in the backcoat layer is, for example, 0.1 to 3.0 weight parts, desirably 0.1 to 1.0 weight parts, per 100.0 weight parts of nonmagnetic powder.

It is desirable to employ a fatty acid in combination with one or more fatty acid derivative. It is preferable to employ a fatty acid in combination with one or more selected from the group consisting of fatty acid esters and fatty acid amides. And it is of greater preference to employ a fatty acid in combination with a fatty acid ester and a fatty acid amide.

When employing a fatty acid in combination with a fatty acid derivative (ester, amide, or the like), the fatty acid-derived moiety of the fatty acid derivative desirably has the same structure or one similar to that of the fatty acid with which it is being employed. As an example, when employing stearic acid as a fatty acid, it is desirable to employ a stearic acid ester and/or amide stearate.

The lubricant described in Japanese Unexamined Patent Publication (KOKAI) No. 2009-96798, paragraph 0111 can be employed. The content of the above publication is expressly incorporated herein by reference in its entirety The lubricants set forth above can be incorporated into the magnetic layer and/or into an optionally provided nonmagnetic layer. Known techniques relating to the formulas of the individual layers can be applied to the types and/or quantities of lubricant in each of the layers.

<Nitrogen-Containing Polymer>

Incorporating a lubricant into the backcoat layer tends to increase the value of the 1-bromonaphthalene contact angle that is measured on the surface of the backcoat layer. However, as stated above, just incorporating a lubricant into a backcoat layer that is less than or equal to 0.20 μm in thickness normally does not readily control the 1-bromonaphthalene contact angle to within a range of 10.0° and 30.0°. Accordingly, it is desirable to incorporate a 1-bromonaphthalene angle-adjusting component other than a lubricant along with an optional lubricant into the backcoat layer. In one embodiment, such a component is desirably a nitrogen-containing polymer. The present inventors presume that the polymer chain that is contained in the nitrogen-containing polymer can contribute to increasing the 1-bromonaphthalene contact angle that is measured on the surface of the backcoat layer.

The term "nitrogen-containing polymer" refers to a polymer containing nitrogen atoms in the structure thereof. Examples of desirable nitrogen-containing polymers are amine polymers in the form of polyalkyleneimine polymers and amine polymers other than polyalkyleneimine polymers.

In one embodiment, the nitrogen-containing polymer is desirably a polymer the weight average molecular weight of which falls within a range that is not greater than the weight average molecular weight of the binder contained in the backcoat layer. For example, the weight average molecular weight of the above nitrogen-containing polymer can be less than or equal to 80,000, less than or equal to 60,000, less than or equal to 40,000, less than or equal to 35,000, less than or equal to 30,000, less than or equal to 20,000, or less than or equal to 10,000. Further, the weight average molecular weight can be, for example, greater than or equal to 1,000, greater than or equal to 1,500, greater than or equal to 2,000, or greater than or equal to 3,000. Unless specifically stated otherwise, the term "weight average molecular weight" as referred to in the present invention and present specification is a value measured by gel permeation chromatography (GPC) under the following measurement conditions and converted to a polystyrene equivalent.

GPC value: HLC-8120 (made by Tosoh Corp.)
Column: TSK gel Multipore HXL-M (7.8 mm inner diameter (ID)×30.0 cm, made by Tosoh Corp.)
Eluent: Tetrahydrofuran (THF)

Desirable polyalkyleneimine polymers are described below.

<<Polyalkyleneimine Polymer>>
(Polyalkyleneimine Chain)

The term "polyalkyleneimine polymer" refers to a polymer containing one or more polyalkyleneimine chains. In one embodiment, it is presumed that the polyalkyleneimine chain can function as a moiety adsorbing to the nonmagnetic powder in the backcoat layer. The term "polyalkyleneimine chain" refers to a polymerization structure containing two or more identical or different alkyleneimine chains. Examples of the alkyleneimine chains that are contained are the alkyleneimine chain denoted by formula A below and the alkyleneimine chain denoted by formula B below. Among the alkyleneimine chains denoted by the formulas given below, the alkyleneimine chain denoted by formula A can contain a bond position with another polymer chain. The alkyleneimine chain denoted by formula B can be bonded by means of a salt crosslinking group (described in greater detail further below) to another polymer chain. The polyalkyleneimine chain can have only a linear structure, or can have a branched tertiary amine structure. Examples comprising branched structures are ones where the alkyleneimine chain is bonded to an adjacent alkyleneimine chain at $*^1$ in formula A below and where it is bonded to the adjacent alkyleneimine chain at $*^2$ in formula B below.

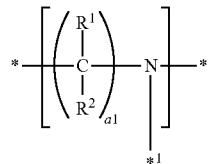

Formula A

In formula A, each of $R^1$ and $R^2$ independently denotes a hydrogen atom or an alkyl group; a1 denotes an integer of equal to or greater than 2; and $*^1$ denotes the site of a bond with an adjacent another polymer chain (such as a polyester chain, an adjacent alkyleneimine chain set forth below), or a hydrogen atom or a substituent.

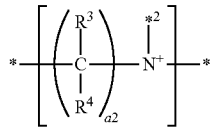

Formula B

In formula B, each of $R^3$ and $R^4$ independently denotes a hydrogen atom or an alkyl group, and a2 denotes an integer of equal to or greater than 2. The alkyleneimine chain denoted by formula B bonds to another polymer chain having an anionic group by $N^+$ in formula B and the anionic group contained in another polymer chain forming a salt crosslinking group.

The * in formulas A and B, and the $*^2$ in formula B, each independently denotes the position of a bond with an adjacent alkyleneimine chain, a hydrogen atom or a substituent.

Formulas A and B will be described in greater detail below. In the present invention and the present specification, unless specifically stated otherwise, the groups that are described can be substituted or unsubstituted. When a given group contains substituent(s), examples of the substituent are alkyl groups (such as alkyl groups having 1 to 6 carbon atoms), hydroxyl groups, alkoxy groups (such as alkoxy groups having 1 to 6 carbon atoms), halogen atoms (such as fluorine atoms, chlorine atoms, and bromine atoms), cyano groups, amino groups, nitro groups, acyl groups, and carboxyl groups. For a group having a substituent, the "number of carbon atoms" means the number of carbon atoms of the portion not containing the substituent.

Each of $R^1$ and $R^2$ in formula A, and each of $R^3$ and $R^4$ in formula B, independently denotes a hydrogen atom or an alkyl group. Examples of the alkyl groups are alkyl groups having 1 to 6 carbon atoms, desirably alkyl groups having 1 to 3 carbon atoms, preferably methyl or ethyl groups, and more preferably, methyl groups. Combinations of $R^1$ and $R^2$ in formula A include an embodiment where one denotes a hydrogen atom and the other denotes an alkyl group, an embodiment where both denote alkyl groups (identical or different alkyl groups), and desirably, an embodiment where both denote hydrogen atoms. The above matters are also applied to $R^3$ and $R^4$ in formula B.

The structure with the fewest carbon atoms constituting the ring in an alkyleneimine is ethyleneimine. The number of carbon atoms on the main chain of the alkyleneimine chain (ethyleneimine chain) obtained by opening the ring of ethyleneimine is 2. Accordingly, the lower limit of a1 in formula A and of a2 in formula B is 2. That is, each of a1 in formula A and a2 in formula B independently denotes an integer of equal to or greater than 2. Each of a1 in formula A and a2 in formula B can be independently, for example, equal to or less than 10, desirably equal to or less than 6, preferably equal to or less than 4, more preferably 2 or 3, and still more preferably, 2.

The bond between the alkyleneimine chain denoted by formula A and the alkyleneimine chain denoted by formula B and another polymer chain will be described further below.

Each of the alkyleneimine chains set forth above bonds to an adjacent alkyleneimine chain, a hydrogen atom, or a substituent at the positions denoted by * in the various formulas above. An example of a substituent is a monovalent substituent such as an alkyl group (such as an alkyl group with 1 to 6 carbon atoms), but this is not a limitation. Another polymer chain (such as a polyester chain set forth below) can also be bonded as a substituent.

The number average molecular weight of the polyalkyleneimine chain contained in the polyalkyleneimine polymer is desirably equal to or higher than 300, and preferably equal to or higher than 500. It is desirably equal to or lower than 3,000, and preferably equal to or lower than 2,000. The number average molecular weight of the polyalkyleneimine chain contained in the polyalkyleneimine polymer refers to a value obtained as described in paragraph 0027 of Japanese Unexamined Patent Publication (KOKAI) No. 2015-28830, which is expressly incorporated herein by reference in its entirety.

From the perspective of facilitating control of the 1-bromonaphthalene contact angle, the proportion accounted for by polyalkyleneimine chains in the polyalkyleneimine polymer (also referred to as the "polyalkyleneimine chain ratio", hereinafter) is desirably less than 5.0 weight percent, preferably less than or equal to 4.9 weight percent, more preferably less than or equal to 4.8 weight percent, still more preferably less than or equal to 4.5 weight percent, yet more preferably less than or equal to 4.0 weight percent, and even more preferably, less than or equal to 3.0 weight percent. From the same perspective, the polyalkyleneimine chain ratio is desirably greater than or equal to 0.2 weight percent, preferably greater than or equal to 0.3 weight percent, and more preferably, greater than or equal to 0.5 weight percent.

The above proportion accounted for by polyalkyleneimine chains can be controlled, for example, by means of the mixing ratio of polyalkyleneimine and polyester employed during synthesis.

The proportion in the polyalkyleneimine polymer accounted for by the polyalkyleneimine chain can be calculated from the results of analysis by nuclear magnetic resonance (NMR)—more specifically, $^1$H-NMR and $^{13}$C-NMR—and by elemental analysis by known methods. Since the value thus calculated is identical to or similar to the theoretical value obtained from the compounding ratio of the synthesis starting materials of the polyalkyleneimine polymer, the theoretical value obtained from the compounding ratio can be adopted as the proportion in the polyalkyleneimine polymer accounted for by the polyalkyleneimine chain (polyalkyleneimine chain ratio).

(Polyester Chain)

In addition to the polyalkyleneimine chain set forth above, the polyalkyleneimine polymer desirably contains another polymer chain(s). A desirable example of another polymer chain is a hydrophobic chain. The hydrophobic chain is desirably a polyester chain. In one embodiment, the alkyleneimine chain denoted by formula A and a polyester chain can form —N—(C=O)— by bonding of the nitrogen atom N in formula A to a carbonyl group —(C=O)— at *$^1$ in formula A. In another embodiment, the alkyleneimine chain denoted by formula B and a polyester chain can form a salt crosslinking group by means of the nitrogen cation N$^+$ in formula B and the anionic group present in a polyester chain. An example of a salt crosslinking group is one formed from the oxygen anion O$^-$ contained in a polyester chain and the N$^+$ contained in formula B. However, this is not intended as a limitation.

The polyester chain denoted by formula 1 below is an example of a polyester chain bonding to the nitrogen atom N contained in formula A by means of a carbonyl bond —(C=O)— to the alkyleneimine chain denoted by formula A. The polyester chain denoted by formula 1 below can bond to the alkyleneimine chain denoted by formula A at the bond position denoted by *$^1$ by the formation of —N—(C=O)— by the nitrogen atom contained in the alkyleneimine chain and the carbonyl group —(C=O)— contained in the polyester chain.

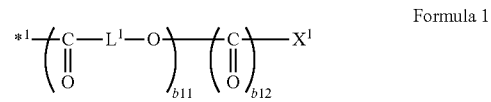

Formula 1

The polyester chain denoted by formula 2 below is an example of a polyester chain that can bond to the alkyleneimine chain denoted by formula B by means of the N$^+$ in formula B and an anionic group contained in the polyester chain forming a salt crosslinking group. In the polyester chain denoted by formula 2 below, the oxygen anion O$^-$ and the N$^+$ in formula B can form a salt crosslinking group.

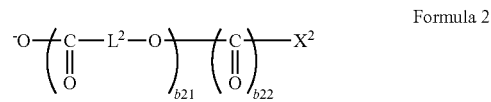

Formula 2

Each of L$^1$ in formula 1 and L$^2$ in formula 2 independently denotes a divalent linking group. A desirable example of a divalent linking group is an alkylene group having 3 to 30 carbon atoms. As set forth above, the number of carbon atoms in an alkylene group refers to the portion (main chain portion) excluding the substituent when the alkylene group contains a substituent.

Each of b11 in formula 1 and b21 in formula 2 independently denotes an integer of equal to or greater than 2; for example, an integer of equal to or less than 200. The number of repeating lactone units given in Examples further below corresponds to b11 in formula 1 or b21 in formula 2.

Each of b12 in formula 1 and b22 in formula 2 independently denotes 0 or 1.

Each of X$^1$ in formula 1 and X$^2$ in formula 2 independently denotes a hydrogen atom or a monovalent substituent. Examples of monovalent substituents are monovalent substituents selected from the group consisting of alkyl groups, haloalkyl groups (such as fluoroalkyl groups), alkoxy groups, polyalkyleneoxyalkyl groups, and aryl groups.

The alkyl group may be substituted or unsubstituted. An alkyl group substituted with at least one hydroxyl group (a hydroxyalkyl group) and an alkyl group substituted with at least one halogen atom are desirable as a substituted alkyl group. An alkyl group in which all the hydrogen atoms bonded to carbon atoms have been substituted with halogen atoms (a haloalkyl group) is also desirable. Examples of halogen atoms include fluorine, chlorine and bromine atoms. An alkyl group having 1 to 30 carbon atoms is preferred, and an alkyl group having 1 to 10 carbon atoms is of greater preference. The alkyl group can be linear, have a branched chain, or be cyclic. The same applies to a haloalkyl group.

With regard to specific examples of substituted or unsubstituted alkyl group and haloalkyl group, reference can be made to paragraph 0052 of Japanese Unexamined Patent Publication (KOKAI) No. 2015-28830. Reference can be made to paragraph 0053 of Japanese Unexamined Patent Publication (KOKAI) No. 2015-28830 with regard to specific examples of alkoxy groups.

Polyalkyleneoxyalkyl groups are monovalent substituents denoted by $R^{10}(OR^{11})n(O)m$-. $R^{10}$ denotes an alkyl group, $R^{11}$ denotes an alkylene group, n denotes an integer of equal to or greater than 2, and m denotes 0 or 1.

The alkyl group denoted by $R^{10}$ is as described for the alkyl groups denoted by $X^1$ and $X^2$. The details of the alkylene group denoted by $R^{11}$ are as follows. The above description of the alkyl groups denoted by $X^1$ and $X^2$ can be applied to these alkylene groups by reading alkylenes with one fewer hydrogen atom for the former (for example, by reading "methylene group" for "methyl group"). n denotes an integer of equal to or greater than 2; for example, an integer of equal to or less than 10, desirably equal to or less than 5.

The aryl group can be substituted and can be a condensed ring. It is preferably an aryl group with 6 to 24 carbon atoms, such as a phenyl group, a 4-methylphenyl group, 4-phenylbenzoic acid, a 3-cyanophenyl group, a 2-chlorophenyl group, or a 2-naphthyl group.

The polyester chains denoted by formulas 1 and 2 above can be structures derived from polyesters obtained by known polyester synthesis methods. Lactone ring-opening polymerization is an example of a polyester synthesis method. Examples of lactones are those described in paragraph 0056 of Japanese Unexamined Patent Publication (KOKAI) No. 2015-28830. ε-caprolactone, lactides, and δ-valerolactone are desirable as lactones from the perspectives of reactivity and/or availability. However, there is no limitation thereto. Any lactone yielding polyester by means of ring-opening polymerization will do.

With regard to nucleophilic reagents in lactone ring-opening polymerization, reference can be made to paragraph 0057 of Japanese Unexamined Patent Publication (KOKAI) No. 2015-28830.

However, the above polyester chain is not limited to a structure derived from polyester obtained by lactone ring-opening polymerization. It can have a structure derived from polyester obtained by a known polyester synthesis method such as polycondensation of a polyvalent carboxylic acid and polyhydric alcohol or polycondensation of a hydroxycarboxylic acid.

From the perspective of facilitating control of the 1-bromonaphthylene contact angle, the number average molecular weight of the polyester chain is desirably greater than or equal to 200, preferably greater than or equal to 400, and more preferably, greater than or equal to 500. From the same perspective, the number average molecular weight of the polyester chain is desirably less than or equal to 100,000, preferably less than or equal to 50,000. The term "number average molecular weight of the polyester chain" refers to a value that is obtained as described in paragraph 0059 of Japanese Unexamined Patent Publication (KOKAI) No. 2015-28830.

(Weight Average Molecular Weight of the Polyalkyleneimine Polymer)

The average molecular weight of the polyalkyleneimine polymer is, for example, greater than or equal to 1,000, and also by way of example, less than or equal to 80,000, as a weight average molecular weight. The weight average molecular weight of the polyalkyleneimine polymer is desirably greater than or equal to 1,500, preferably greater than or equal to 2,000, and more preferably, greater than or equal to 3,000. In one embodiment, the weight average molecular weight of the polyalkyleneimine polymer is desirably less than or equal to 60,000, preferably less than or equal to 40,000, more preferably less than or equal to 35,000, still more preferably less than or equal to 34,000, still further preferably less than or equal to 30,000, still further more preferably less than or equal to 20,000, yet still further more preferably, less than or equal to 10,000.

In the present invention and the present specification, the term "weight average molecular weight of the polyalkyleneimine polymer" refers to a value that is obtained by gel permeation chromatography (GPC) and converted to the standard styrene conversion. Reference can be made to Examples of Japanese Unexamined Patent Publication (KOKAI) No. 2015-28830, for measurement conditions.

(Synthesis Method)

The method of synthesizing the polyalkyleneimine polymer is not specifically limited. For one desirable form of a synthesis method, reference can be made to Japanese Unexamined Patent Publication (KOKAI) No. 2015-28830, paragraphs 0061 to 0069 and the Examples of the same.

(Other Polymer Chains)

The polyalkyleneimine polymer can have polymer chain(s) other than a polyester chain, or can have polymer chain(s) other than a polyester chain in addition to a polyester chain. As regards the introduction of a polyester chain, such a polymer chain can be introduced into a polyalkyleneimine polymer by a method identical to the method described in the above-cited paragraphs of Japanese Unexamined Patent Publication (KOKAI) No. 2015-28830, for example.

<<Other Amine Polymers>>

The above-described polyalkyleneimine polymer is a type of amine polymer. The nitrogen-containing polymer can be an amine polymer other than a polyalkyleneimine polymer. Further, a polyalkyleneimine polymer and another amine polymer can be employed in combination.

The amine polymer can be a primary amine denoted by $NH_2R$, a secondary amine denoted by $NHR_2$, or a tertiary amine denoted by $NR_3$. In these formulas, R denotes any structure constituting an amine polymer. A plurality of R being present can be identical or different.

Examples of the polymer chain that is present on the amine polymer are various polymer chains such as polyester chains, polyamide chains, and polyurethane chains. The number average molecular weight of the polymer chain desirably falls within the range given for the polyester chain of the polyalkyleneimine polymer set forth above. Amine polymers synthesized by known methods, as well as commercial products, can be employed. Specific examples of commercial products are ANTI-TERRA-U/U100, ANTI-TERRA-204/205, DISPERBYK-101, DISPERBYK-102, DISPERBYK-103, DISPERBYK-106, DISPERBYK-108, DISPERBYK-109, DISPERBYK-110, DISPERBYK-111, DISPERBYK-112, DISPERBYK-116, DISPERBYK-130, DISPERBYK-140, DISPERBYK-142, DISPERBYK-145, DISPERBYK-161, DISPERBYK-162, DISPERBYK-163, DISPERBYK-164, DISPERBYK-166, DISPERBYK-160, DISPERBYK-167, DISPERBYK-168, DISPERBYK-170, DISPERBYK-171, DISPERBYK-174, DISPERBYK-180, DISPERBYK-182, DISPERBYK-183, DISPERBYK-184, DISPERBYK-185, DISPERBYK-2000, DISPERBYK-2001, DISPERBYK-2020, DISPERBYK-2050, DIS- PERBYK-2070, DISPERBYK-2096, DISPERBYK-2150, BYK-P104, BYK-P105, BYK-9076, BYK-9077, BYK-220S, manufactured by BYK Japan. However, the amine polymer is not limited to those exemplified above.

One or more types of the above nitrogen-containing polymers can be incorporated into the backcoat layer. From the perspective of ease of controlling the 1-bromonaphthalene contact angle, the content of the nitrogen-containing polymer, desirably an amine polymer, in the backcoat layer is desirably greater than or equal to 0.5 weight part, preferably greater than or equal to 1.0 weight part, per 100.0 weight parts of nonmagnetic powder. From the same perspective, the content of the nitrogen-containing polymer in the backcoat layer is desirably less than or equal to 50.0 weight parts, preferably less than or equal to 40.0 weight parts, more preferably less than or equal to 30.0 weight parts, still more preferably less than or equal to 20.0 weight parts, and even more preferably, less than or equal to 15.0 weight parts, per 100 weight parts of nonmagnetic powder.

Various layers and nonmagnetic support of the above magnetic tape will be further described in detail below.

[Magnetic Layer]

<Ferromagnetic Powder>

The magnetic layer contains ferromagnetic powder and binder. Various powders that are commonly employed as ferromagnetic powder in the magnetic layers of magnetic recording media such as magnetic tapes can be employed as the ferromagnetic powder. The use of ferromagnetic powder of small average particle size is desirable from the perspective of enhancing the recording density of the magnetic tape. To that end, the ferromagnetic powder with an average particle size of less than or equal to 50 nm is desirably employed. From the perspective of the stability of magnetization, the ferromagnetic powder with an average particle size of greater than or equal to 10 nm is desirably employed.

The average particle size of the ferromagnetic powder is a value measured with a transmission electron microscope by the following method.

Ferromagnetic powder is photographed at a magnification of 100,000-fold with a transmission electron microscope, and the photograph is printed on print paper at a total magnification of 500,000-fold to obtain a photograph of the particles constituting the ferromagnetic powder. A target particle is selected from the photograph of particles that has been obtained, the contour of the particle is traced with a digitizer, and the size of the (primary) particle is measured. The term "primary particle" refers to an unaggregated, independent particle.

The above measurement is conducted on 500 randomly extracted particles. The arithmetic average of the particle size of the 500 particles obtained in this manner is adopted as the average particle size of the ferromagnetic powder. A Model H-9000 transmission electron microscope made by Hitachi can be employed as the above transmission electron microscope, for example. The particle size can be measured with known image analysis software, such as KS-400 image analysis software from Carl Zeiss.

In the present invention and the present specification, the average particle size of the powder, such as ferromagnetic powder and various kinds of powder, is the average particle size as obtained by the above method, unless otherwise stated. The average particle size indicated in Examples further below was obtained using a Model H-9000 transmission electron microscope made by Hitachi and KS-400 image analysis software made by Carl Zeiss, unless otherwise stated.

The method described in paragraph 0015 of Japanese Unexamined Patent Publication (KOKAI) No. 2011-048878, which is expressly incorporated herein by reference in its entirety, for example, can be employed as the method of collecting sample powder such as ferromagnetic powder from a magnetic layer for particle size measurement.

In the present invention and the present specification, the size of the particles constituting powder such as ferromagnetic powder (referred to as the "particle size", hereinafter) is denoted as follows based on the shape of the particles observed in the above particle photograph:

(1) When acicular, spindle-shaped, or columnar (with the height being greater than the maximum diameter of the bottom surface) in shape, the particle size is denoted as the length of the major axis constituting the particle, that is, the major axis length.

(2) When platelike or columnar (with the thickness or height being smaller than the maximum diameter of the plate surface or bottom surface) in shape, the particle size is denoted as the maximum diameter of the plate surface or bottom surface.

(3) When spherical, polyhedral, of unspecific shape, or the like, and the major axis constituting the particle cannot be specified from the shape, the particle size is denoted as the diameter of an equivalent circle. The term "diameter of an equivalent circle" means that obtained by the circle projection method.

The "average acicular ratio" of a powder refers to the arithmetic average of values obtained for the above 500 particles by measuring the length of the minor axis, that is the minor axis length, of the particles measured above, and calculating the value of the (major axis length/minor axis length) of each particle. The term "minor axis length" refers to, in the case of the particle size definition of (1), the length of the minor axis constituting the particle; in the case of (2), the thickness or height, and in the case of (3), since the major axis and minor axis cannot be distinguished, (major axis length/minor axis length) is deemed to be 1 for the sake of convenience.

When the particle has a specific shape, such as in the particle size definition of (1) above, the average particle size is the average major axis length. In the case of (2), the average particle size is the average plate diameter, with the average plate ratio being the arithmetic average of (maximum diameter/thickness or height). For the definition of (3), the average particle size is the average diameter (also called the average particle diameter).

Ferromagnetic hexagonal ferrite powder is a specific example of desirable ferromagnetic powder. From the perspectives of achieving higher density recording and magnetization stability, the average particle size (for example, average plate diameter) of ferromagnetic hexagonal ferrite powder desirably ranges from 10 nm to 50 nm, preferably 20 nm to 50 nm. Reference can be made to Japanese Unexamined Patent Publication (KOKAI) No. 2011-225417, paragraphs 0012 to 0030, Japanese Unexamined Patent Publication (KOKAI) No. 2011-216149, paragraphs 0134 to 0136, and Japanese Unexamined Patent Publication (KOKAI) No. 2012-204726, paragraphs 0013 to 0030, for details on ferromagnetic hexagonal ferrite powder. The contents of the above publications are expressly incorporated herein by reference in their entirety.

Ferromagnetic metal powder is also a specific example of desirable ferromagnetic powder. From the perspectives of achieving higher density recording and magnetization stability, the average particle size (for example, average major axis length) of ferromagnetic metal powder desirably ranges from 10 nm to 50 nm, preferably 20 nm to 50 nm. Reference can be made to Japanese Unexamined Patent Publication (KOKAI) No. 2011-216149, paragraphs 0137 to 0141, and Japanese Unexamined Patent Publication (KOKAI) No. 2005-251351, paragraphs 0009 to 0023, for details on ferromagnetic metal powder. The contents of the above publications are expressly incorporated herein by reference in their entirety.

The content (fill rate) of ferromagnetic powder in the magnetic layer desirably falls within a range of 50 weight % to 90 weight %, preferably within a range of 60 weight % to 90 weight %. Components other than ferromagnetic powder in the magnetic layer are at least binder, and one or more additives can be optionally incorporated. A high fill rate is desirable from the perspective of increasing recording density.

<Binder, Curing Agent>

The above magnetic tape is a particulate magnetic tape and contains ferromagnetic powder and binder in the magnetic layer. The binder contains one or more resins. The resins can be homopolymers or copolymers. The various resins that are commonly employed as binders in particulate magnetic recording media such as magnetic tapes can be employed as the binder. Examples of binders are: polyurethane resin, polyester resin, polyamide resin, vinylchloride resin, styrene, copolymerized acrylic resin of acrylonitrile, methyl methacrylate, and the like; nitrocellulose and other cellulose resin; epoxy resin; phenoxy resin; and polyvinyl acetal, polyvinyl butyral, and other polyvinyl alkyral resin. These can be employed singly, or multiple resins can be mixed for use. Of these, polyurethane resin, acrylic resin, cellulose resin, and vinylchloride resin are desirable. These resins can also be employed as binders in the backcoat layer described further below and in the nonmagnetic layer that can be provided. Reference can be made to Japanese Unexamined Patent Publication (KOKAI) No. 2010-24113, paragraphs 0028 to 0031, with regard to these resins. The content of the above publication is expressly incorporated herein by reference in its entirety. The average molecular weight of resins that are employed as binders is, by way of example, greater than or equal to 30,000, and less than or equal to 200,000 as a weight average molecular weight.

A curing agent can be employed along with the above resins employed as binders. The curing agent can be a thermosetting compound—a compound in which a curing reaction (crosslinking reaction) progresses when heated—in one embodiment. In another embodiment, the curing agent can be a photo-curable compound—a compound in which a curing reaction (crosslinking reaction) progresses when irradiated with light. Thermosetting compounds are desirable as curing agents; polyisocyanate is suitable. Reference can be made to Japanese Unexamined Patent Publication 2011-216149, paragraphs 0124 and 0125, for details regarding polyisocyanate. In the magnetic layer-forming composition, the curing agent can be employed, for example, in a quantity of 0 to 80.0 weight parts per 100.0 weight parts of binder. From the perspective of enhancing strength of the magnetic layer, a curing agent can be added in a quantity of 50.0 to 80.0 weight parts for use.

<Additives>

Ferromagnetic powder and binder are contained in the magnetic layer. As necessary, one or more additives can also be contained. Examples of additives are the above curing agents. A curing agent can be incorporated into the magnetic layer in a state such that at least a portion thereof undergoes a (crosslinking) reaction with another component such as the binder as the curing reaction progresses in the magnetic layer-forming process. The same applies to the layer that is formed with the composition in cases where the composition that is employed to form another layer such as the backcoat layer-forming composition contains a curing agent. Examples of additives contained in the magnetic layer are nonmagnetic powder (such as inorganic powder and carbon black), lubricants, dispersing agents, dispersion adjuvants, antifungal agents, antistatic agents, and oxidation inhibitors. Examples of nonmagnetic powder is nonmagnetic powder capable of functioning as abrasives and nonmagnetic powder capable of functioning as protrusion-forming agents that form protrusions that suitably protrude from the surface of the magnetic layer (such as nonmagnetic colloidal particles). The average particle size of the colloidal silica (silica colloid particles) indicated in Examples further below is a value obtained by the method described as the method of measuring the average particle diameter in Japanese Unexamined Patent Publication (KOKAI) No. 2011-048878, paragraph 0015. The additives can be employed in any quantity by suitably selecting commercial products based on the properties desired. An example of an additive that can be employed in a magnetic layer containing an abrasive is the dispersing agent for enhancing dispersion of abrasive that is described in paragraphs 0012 to 0022 of Japanese Unexamined Patent Publication (KOKAI) No. 2013-131285, which is expressly incorporated herein by reference in its entirety.

The above-described magnetic layer can be provided directly on the surface of a nonmagnetic support or over a nonmagnetic layer on the surface of a nonmagnetic support. Details regarding the nonmagnetic layer and the nonmagnetic support will be given further below.

[Nonmagnetic Layer]

The nonmagnetic layer will be described next. In the above magnetic tape, a magnetic layer can be present directly on the nonmagnetic support, or a magnetic layer can be present over at least one other layer on the nonmagnetic support. This other layer is desirably a nonmagnetic layer containing nonmagnetic powder and binder. The nonmagnetic powder that is employed in the nonmagnetic layer can be an organic or an inorganic substance. Carbon black or the like can also be employed. Examples of inorganic materials are metals, metal oxides, metal carbonates, metal sulfates, metal nitrides, metal carbides, and metal sulfides. These nonmagnetic powders are available as commercial products and can be manufactured by known methods. Reference can be made to Japanese Unexamined Patent Publication (KOKAI) No. 2011-216149, paragraphs 0146 to 0150, for details. Reference can be made to Japanese Unexamined Patent Publication (KOKAI) No. 2010-24113, paragraphs 0040 and 0041, for details on carbon black that can be used in the nonmagnetic layer. The content (fill rate) of nonmagnetic powder in the nonmagnetic layer desirably falls within a range of 50 weight % to 90 weight %, preferably within a range of 60 weight % to 90 weight %.

Known techniques can be applied to the nonmagnetic layer with regard to the binder, additives, and other details relating to the nonmagnetic layer. For example, known techniques relating to the magnetic layer can be applied to the quantity and type of binder and the quantity and type of additives.

The nonmagnetic layer in the above magnetic tape may be in the form of an essentially nonmagnetic layer containing small quantities of ferromagnetic powder, either in the form of impurities or by intention, for example, along with nonmagnetic powder. In the present invention, the term "essentially nonmagnetic layer" refers to a layer with a residual magnetic flux density of less than or equal to 10 mT, a coercive force of less than or equal to 7.96 kA/m (100 Oe), or a layer with a residual magnetic flux density of less than or equal to 10 mT and a coercive force of less than or equal to 7.96 kA/m (100 Oe). The nonmagnetic layer desirably has neither residual magnetic flux density nor coercive force.

[Backcoat Layer]

In the above magnetic tape, a backcoat layer is present on the opposite surface of the nonmagnetic support from that on which the magnetic layer is present. As stated above, the thickness of the backcoat layer is less than or equal to 0.20 μm and the 1-bromonaphthalene contact angle measured on the surface of the backcoat layer falls within a range of 10.0° to 30.0°. The backcoat layer contains nonmagnetic powder and binder. As set forth above, the backcoat layer contains a 1-bromonaphthalene contact angle-adjusting component. The backcoat layer can also further contain optional known additives. Known techniques with regard to backcoat layers and known techniques with regard to magnetic layers and/or nonmagnetic layers can be applied to other details such as the binder and additives in the backcoat layer.

Either carbon black or nonmagnetic powder other than carbon black, or both, can be employed as the nonmagnetic powder contained in the backcoat layer. Examples of nonmagnetic powder other than carbon black are various powder of inorganic substances (inorganic powder). Specific examples are inorganic powder such as iron oxides (such as bengala (colcothar)), titanium oxides such as titanium dioxide, cerium oxide, tin oxide, tungsten oxide, ZnO, $ZrO_2$, $SiO_2$, $Cr_2O_3$, α-alumina, β-alumina, γ-alumina, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide. The above description relating to the nonmagnetic powder contained in the nonmagnetic layer can be referred to with regard to the nonmagnetic powder contained in the backcoat layer.

The nonmagnetic powder other than carbon black can be acicular, spherical, polyhedral, or plate-like in shape. The average particle size of the nonmagnetic powder desirably falls within a range of 0.005 μm to 2.00 μm and preferably falls within a range of 0.01 μm to 0.20 μm. The specific surface area of the nonmagnetic powder determined by the Brunauer-Emmett-Teller (BET) method (BET specific surface area) desirably falls within a range of 1 $m^2/g$ to 100 $m^2/g$, preferably 5 $m^2/g$ to 70 $m^2/g$, and more preferably, within a range of 10 $m^2/g$ to 65 $m^2/g$. The average particle size of the carbon black falls, for example, within a range of 5 nm to 80 nm, desirably 10 nm to 50 nm, and more preferably, within a range of 10 nm to 40 nm. Reference can be made to the description given above with regard to the nonmagnetic powder of the nonmagnetic layer for the content (fill rate) of nonmagnetic powder in the backcoat layer. The content of carbon black falls, for example, within a range of 10.0 to 100.0 weight parts per 100.0 weight parts of the total quantity of nonmagnetic powder. The entire quantity of nonmagnetic powder can also consist of carbon black. Alternatively, the entire quantity of nonmagnetic powder can consist of nonmagnetic powder other than carbon black. Carbon black is thought to have the property of having a lesser tendency to adsorb fatty acids than other nonmagnetic powders. Thus, it is to be inferred that the greater the proportion of the nonmagnetic powder that is accounted for by carbon black in the backcoat layer, the less fatty acid tends to accumulate within the backcoat layer and the more readily fatty acid tends to be supplied to the surface of the backcoat layer. It is thought that the greater the quantity of fatty acid supplied to the surface of the backcoat layer, the higher the value of the 1-bromonaphthalene contact angle measured on the surface of the backcoat layer. It is also possible to adjust the 1-bromonaphthalene contact angle by adjusting the type and ratio of nonmagnetic powder in the backcoat layer in this manner.

[Nonmagnetic Support]

The nonmagnetic support will be described next. Known nonmagnetic supports in the form of biaxially stretched polyethylene terephthalate, polyethylene naphthalate, polyamide, polyamide-imide, aromatic polyamide, and the like are examples. Of these, polyethylene terephthalate, polyethylene naphthalate, and polyamide are desirable. These supports can be subjected in advance to treatments such as corona discharge, plasma treatments, adhesion-enhancing treatments, and heat treatments.

[Thickness of Nonmagnetic Support, Thickness of Various Layers]

The thickness of the nonmagnetic support is desirably 3.00 μm to 20.00 μm, preferably 3.00 μm to 10.00 μm, more preferably 3.00 μm to 6.00 μm, and still more preferably, 3.00 μm to 4.50 μm.

The thickness of the magnetic layer is desirably optimized based on the saturation magnetization of the magnetic head employed, the head gap length, the bandwidth of the recording signal, and the like. To achieve higher density recording, the thickness of the magnetic layer is desirably 10 nm to 100 nm, preferably 20 nm to 90 nm. The magnetic layer can consist of at least one layer, or can be separated into two or more layers having different magnetic characteristics applying a known multilayer magnetic layer configuration. When separated into two or more layers, the thickness of the magnetic layer refers to the combined thickness of the layers.

The thickness of the nonmagnetic layer is, for example, greater than or equal to 0.05 μm, preferably greater than or equal to 0.07 μm, and more preferably, greater than or equal to 0.10 μm. Additionally, the thickness of the nonmagnetic layer is desirably less than or equal to 0.80 μm, preferably less than or equal to 0.50 μm.

The thickness of the backcoat layer is as set forth above. Reducing the thickness of the backcoat layer is one example of a way to reduce the thickness of the magnetic tape. From the perspective of increasing the recording capacity per magnetic tape cartridge by reducing the thickness of the magnetic tape, the overall thickness of the above magnetic tape is desirably less than or equal to 6.00 μm, preferably less than or equal to 5.00 μm, and more preferably, less than or equal to 4.50 μm. From the perspective of ease of handling (the handling property) of the magnetic tape, the overall thickness of the magnetic tape is desirably greater than or equal to 1.00 μm.

The thickness of the various layers and nonmagnetic support of the magnetic tape can be determined by known film thickness measurement methods. As an example, the cross section of the magnetic tape in the direction of thickness can be exposed by a known method such as an ion beam or microtome, and the exposed cross section can be observed by a scanning electron microscope. The various thicknesses can be determined as the thickness determined at one spot in the direction of thickness, or as the arithmetic average of the thicknesses obtained at multiple spots, such as two or more randomly extracted spots. The thickness of the various layers can also be determined as the design thickness calculated from the manufacturing conditions.

[Process of Manufacturing Magnetic Tapes]

The above magnetic tape is a particulate magnetic tape and can be manufactured using compositions (coating liquids) for forming individual layers such as a magnetic layer, backcoat layer, and optionally provided nonmagnetic layer. Specific forms of the process of manufacturing magnetic tapes will be described below. However, the magnetic tape of an aspect of the present invention is not limited to magnetic tapes manufactured by manufacturing processes of the forms set forth below so long as the thickness of the backcoat layer and the 1-bromonaphthalene contact angle that is measured on the surface of the backcoat layer fall within the ranges set forth above.

<Preparation of Compositions for Forming Various Layers>

The compositions (coating liquids) for forming various layers can be provided normally contain solvent in addition to the various components that have been set forth above. Examples of the solvent are the various organic solvents generally employed in the manufacturing of particulate magnetic recording media. The process of preparing the compositions for forming the various layers normally includes at least a kneading step, a dispersion step, and mixing steps provided before and after these steps as needed. Each of these steps can be divided into two or more stages. All of the materials in the form of ferromagnetic powder, nonmagnetic powder, binder, various additives, solvent, and the like can be added at the start, or part way through, any of these steps. The material can be divided for addition in two or more steps. For example, in one embodiment, a dispersion (magnetic liquid) containing ferromagnetic powder and a dispersion (abrasive liquid) containing abrasive can be separately prepared by dispersion, and then simultaneously or sequentially mixed with the other components to prepare a magnetic layer-forming composition. Additionally, reference can be made to paragraph 0065 of Japanese Unexamined Patent Publication (KOKAI) No. 2010-231843, which is expressly incorporated herein by reference in its entirety, with regard to preparing individual layer-forming compositions.

<Coating Process>

The magnetic layer can be formed by directly coating the magnetic layer-forming composition, or by sequentially or simultaneous multilayer coating it with the nonmagnetic layer-forming composition, on the surface of a nonmagnetic support. The surface of the magnetic layer can also be surface treated. Surface treatment is desirable to enhance the surface smoothness of the magnetic layer. An example of the surface treatment of the surface of the magnetic layer is a polishing treatment employing the polishing means described in Japanese Unexamined Patent Publication (KOKAI) Heisei No. 5-62174, which is expressly incorporated herein by reference in its entirety. Reference can be made to paragraphs 0005 to 0032 and the entirety of the drawings of the same publication with regard to the surface treatment.

The backcoat layer can be formed by coating the backcoat layer-forming composition on the surface on the opposite side of the nonmagnetic support from that on which the magnetic layer has been provided, or is to be provided.

Reference can be made to Japanese Unexamined Patent Publication (KOKAI) No. 2010-231843, paragraph 0066, for details regarding coatings to form various layers.

<Other Processes>

Reference can be made to Japanese Unexamined Patent Publication (KOKAI) No. 2010-231843, paragraphs 0067 to 0070, regarding various other processes in manufacturing a magnetic tape.

The magnetic tape of an aspect of the present invention set forth above has a backcoat layer with a reduced thickness of less than or equal to 0.20 µm and can exhibit good running stability. An example of an indicator of running stability is the position error signal (PES) that is evaluated in Examples further below. The lower the PES value, the better the running stability indicated. In one embodiment, the magnetic tape of an aspect of the present invention can achieve a PES of less than or equal to 70 nm.

EXAMPLES

The present invention will be described in greater detail below through Examples. However, the present invention is not limited to the embodiments shown in Examples. The "parts" indicated below denotes "weight parts" unless otherwise stated.

Polyalkyleneimine polymer described below is a polymer synthesized by the following method.

[Synthesis Example of Polyalkyleneimine Polymer]

The acid values and amine values given below were determined by the potentiometric method (solvent: tetrahydrofuran/water=100/10 (volumetric ratio), titrant: 0.01 N (0.01 mol/L) sodium hydroxide aqueous solution (acid value), 0.01 N (0.01 mol/L) hydrochloric acid (amine value)).

The number average molecular weights and weight average molecular weights given below were obtained by measurement by GPC and converted to polystyrene values.

The various measurement conditions for the average molecular weight of polyester, polyalkyleneimine, and polyalkyleneimine polymer were as given below.

(Measurement Conditions for Average Molecular Weight of Polyester)

Measurement apparatus: HLC-8220 GPC (made by Tosoh Corp.)

Column: TSKgel Super HZ 2000/TSKgel Super HZ 4000/TSKgel Super HZ-H (made by Tosoh Corp.)

Eluent: Tetrahydrofuran (THF)

Flow rate: 0.35 mL/min

Column temperature: 40° C.

Detector: Differential refractive (RI) detector (Measurement Conditions for Average Molecular Weight of Polyalkyleneimine and Average Molecular Weight of Polyalkyleneimine Polymer)

Measurement apparatus: HLC-8320 GPC (made by Tosoh Corp.)

Column: Three TSKgel Super AWM-Hs (made by Tosoh Corp.)

Eluent: N-methyl-2-pyrrolidone (with 10 mM lithium bromide added as additive)

Flow rate: 0.35 mL/min

Column temperature: 40° C.

Detector: RI (Synthesis of Polyester (i-1))

In a 500 mL, three-necked flask were mixed 16.8 g of carboxylic acid in the form of n-octanoic acid (Wako Pure Chemical Industries, Ltd.), 100 g of lactone in the form of ε-caprolactone (Praxel M made by Daicel Chemical Industries, Inc.), and 2.2 g of catalyst in the form of monobutyltin oxide (Wako Pure Chemical Industries, Ltd.) ($C_4H_9Sn(O)OH$) and the mixture was heated for 1 hour at 160° C. A 100 g quantity of s-caprolactone was added dropwise over 5 hours and the mixture was stirred for another two hours. Subsequently, the mixture was cooled to room temperature, yielding polyester (i-1).

The synthesis schema is indicated below.

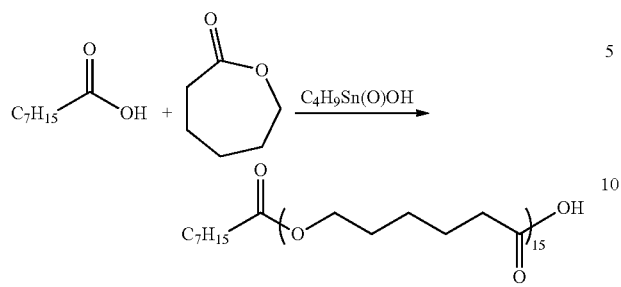

The number average molecular weight and weight average molecular weight of the polyester obtained are given in Table 1 below. The number of units of lactone repeating unit that was calculated from the starting material charge ratio is also given in Table 1.

(Synthesis of Polyethyleneimine Polymer)

A 2.4 g quantity of polyethyleneimine (SP-006, made by Nippon Shokubai Co., number average molecular weight 600) and 100 g of polyester (i-1) were mixed and heated for 3 hours at 110° C., yielding polyethyleneimine polymer.

Based on the results of two forms of NMR analysis, $^1$H-NMR and $^{13}$C-NMR, and on the results of elemental analysis by the combustion method conducted on the polyalkyleneimine polymer that was obtained, the ratio (polyalkyleneimine chain ratio) accounted for by the polyalkyleneimine chain in the polyalkyleneimine polymer was calculated. The results are given in Table 1. The calculated polyalkyleneimine chain ratio was the same value as the value calculated from the quantities of polyalkyleneimine and polyester charged.

Vinyl chloride copolymer (MR-104 made by Zeon Corp.): 10.0 parts
SO$_3$Na group-containing polyurethane resin: 4.0 parts (weight average molecular weight: 70,000, SO$_3$Na groups: 0.07 meq/g)
Methyl ethyl ketone: 150.0 parts
Cyclohexanone: 150.0 parts
(Abrasive liquid)
 α-Alumina (BET specific surface area: 19 m$^2$/g): 6.0 parts
 SO$_3$Na group-containing polyurethane resin (weight average molecular weight: 70,000, SO$_3$Na groups: 0.1 meq/g): 0.6 part
 2,3-Dihydroxynaphthalene: 0.6 part
 Cyclohexanone: 23.0 parts
(Protrusion-Forming Agent Liquid)
 Colloidal silica (average particle size: 120 nm): 2.0 parts
 Methyl ethyl ketone: 8.0 parts
(Lubricant, Curing Agent Liquid)
 Stearic acid: 1.5 parts
 Amide stearate: 0.3 part
 Butyl stearate: 6.0 parts
 Methyl ethyl ketone: 110.0 parts
 Cyclohexanone: 110.0 parts
 Polyisocyanate (Coronate (Japanese registered trademark) L, made by Nippon Polyurethane Industry Co., Ltd.): 3.0 parts
(Nonmagnetic Layer-Forming Composition)
 Carbon black (average particle size: 16 nm, dibutyl phthalate (DBP)
 oil absorption capacity: 74 cm$^3$/100 g) 100.0 parts
 Trioctylamine: 4.0 parts
 Vinyl chloride copolymer (MR-104 made by Zeon Corp.): 19.0 parts
 SO$_3$Na group-containing polyurethane resin

TABLE 1

| | Polyester | Carboxylic acid | Quantity of carboxylic acid charged (g) | Lactone | Weight average molecular weight | Number average molecular weight | Number of repeating lactone units |
|---|---|---|---|---|---|---|---|
| Synthesis of polyester | (i-1) | n-octanoic acid | 16.8 | ε-caprolactone | 7,000 | 5,800 | 15 |

| | Quantity of polyethyleneimine charged (g) | Polyalkyleneimine chain (polyethylene-imine chain) ratio | Polyester | Acid value (mgKOH/g) | Amine value (mgKOH/g) | Weight average molecular weight |
|---|---|---|---|---|---|---|
| Synthesis of polyalkyleneimine (polyethyleneimine) polymer | 2.4 | 2.3 | (i-1) | 35.0 | 17.4 | 7,000 |

Example of Fabrication of Magnetic Tape

Example 1

The formulas of the compositions for forming the various layers are given below.
(Magnetic Layer-Forming Composition)
(Magnetic Liquid)
 Ferromagnetic powder (ferromagnetic hexagonal barium ferrite powder, denoted as "BF" in Table 2): 100.0 parts (coercive force Hc: 196 kA/m (2,460 Oe), average particle size (average plate diameter): 24 nm)
 Oleic acid: 2.0 parts (weight average molecular weight: 50,000, SO$_3$Na groups: 0.07 meq/g): 12.0 parts Methyl ethyl ketone: 370.0 parts
Cyclohexanone: 370.0 parts
Stearic acid: 1.5 parts
Amide stearate: 0.3 part
Butyl stearate: 1.5 parts
(Backcoat Layer-Forming Composition A)
 Bengala (average particle size: 0.15 μm, average acicular ratio: 7, BET specific surface area: 52 m$^2$/g): 80.0 parts
 Carbon black (average particle size: 16 nm, DBP oil absorption capacity:
 74 cm$^3$/100 g): 20.0 parts
 Phenylphosphonic acid: 3.0 parts Vinyl chloride copolymer (MR-104 made by Zeon Corp.):
   12.0 parts
SO$_3$Na group-containing polyurethane resin
   (weight average molecular weight: 50,000, SO$_3$Na
   groups: 0.07 meq/g): 8.0 parts
Polyalkyleneimine polymer synthesized above: See Table
   2
α-Alumina (BET specific surface area: 17 m$^2$/g): 5.0 parts
Methyl ethyl ketone: 370.0 parts
Cyclohexanone: 370.0 parts
Stearic acid: See Table 2
Amide stearate: 0.3 part
Butyl stearate: 2.0 parts
Polyisocyanate (Coronate L made by Nippon Polyurethane Industry Co., Ltd.): 5.0 parts (Preparation of Magnetic Layer-Forming Compositions)

A magnetic layer-forming composition was prepared by the following method.

After kneading and dilution processing the above magnetic liquid in an open kneader, 30 passes of dispersion processing were conducted at a bead fill rate of 80 volume %, a rotor tip peripheral speed of 10 m/s, and a single pass retention time of 2 minutes in a horizontal bead mill disperser using zirconia (ZrO$_2$) beads 0.1 mm in bead diameter (referred to as "Zr beads" hereinafter).

As regards the abrasive liquid, the above components were mixed and then charged with Zr beads 0.3 mm in bead diameter to a horizontal bead mill disperser. The bead volume/(abrasive liquid volume+bead volume) was adjusted to 80% and bead mill dispersion processing was conducted for 120 minutes. Following processing, the liquid was removed and a flow-type ultrasonic dispersion and filtration device was used to conduct an ultrasonic dispersion and filtration treatment.

The magnetic liquid, abrasive liquid, and protrusion-forming agent liquid, as well as other components in the form of the lubricants and curing agent liquid, were introduced into a dissolver stirrer and stirred for 30 minutes at a peripheral speed of 10 m/s. Subsequently, three passes of treatment at a flow rate of 7.5 kg/min were conducted with a flow-type ultrasonic disperser and the dispersion was filtered through a filter with a pore diameter of 1 μm to prepare a magnetic layer-forming composition.

(Preparation of Nonmagnetic Layer-Forming Composition)

A nonmagnetic layer-forming composition was prepared by the following method.

With the exception of the lubricants (stearic acid, amide stearate, and butyl stearate), the above components were kneaded and dilution processed in an open kneader. Subsequently, they were dispersion treated in a horizontal bead mill disperser. The lubricants (stearic acid, amide stearate, and butyl stearate) were then added and the mixture was stirred and mixed in a dissolver stirrer to prepare a nonmagnetic layer-forming composition.

(Preparation of Backcoat Layer-Forming Composition A)

Backcoat layer-forming composition A was prepared by the following method.

With the exception of the polyisocyanate and lubricants (stearic acid, amide stearate, and butyl stearate), the above components were charged to a dissolver stirrer, stirred for 30 minutes at a peripheral speed of 10 m/s, and then dispersion processed in a horizontal bead mill disperser. Subsequently, the polyisocyanate and lubricants (stearic acid, amide stearate, and butyl stearate) were added and the mixture was stirred and mixed in a dissolver stirrer to prepare backcoat layer-forming composition A.

(Fabrication of Magnetic Tape)

The nonmagnetic layer-forming composition was coated and dried to a dry thickness of 0.10 μm on one surface of a nonmagnetic support (polyamide support) 4.00 μm in thickness. Subsequently, the backcoat layer-forming composition was coated and dried to a dry thickness of 0.20 μm on the opposite surface of the nonmagnetic support. The nonmagnetic support, having been wound up on a winding roll, was heat treated for 36 hours in an environment of an atmospheric temperature of 70° C.

Following the heat treatment, the magnetic layer-forming composition was coated and dried to a dry thickness of 70 nm on the nonmagnetic layer.

Subsequently, a surface-smoothing treatment (calendering treatment) was conducted at a calendar roll surface temperature of 100° C., a linear pressure of 300 kg/cm (294 kN/m), and a speed of 100 m/min with a calendar comprised only of metal rolls. Subsequently, a heat treatment was conducted for 36 hours in an environment of an atmospheric temperature of 70° C. Following the heat treatment, the product was slit to ½ inch (0.0127 meter) width.

Next, after winding onto a reel into roll form the magnetic tape obtained by a surface treatment (the embodiment shown in FIGS. 1 to 3 of Japanese Unexamined Patent Application (KOKAI) Heisei No. 5-62174) employing the diamond wheel described in the same publication, the properties thereof were evaluated by the following evaluation method.

In the present Example as well as in Examples, Reference Example, and Comparative Examples set forth further below, the thickness of each layer is the design thickness calculated based on the manufacturing conditions.

Examples 2 to 9, Reference Example 1,
Comparative Examples 1 to 7

With the exceptions that the values indicated in Table 2 were substituted for the thickness of the backcoat layer, the quantity of the above polyalkyleneimine polymer and quantity of stearic acid added to the backcoat layer-forming composition, magnetic tapes were fabricated by the same method as in Example 1.

Example 10

With the exception that backcoat layer-forming composition A was replaced with backcoat layer-forming composition B, a magnetic tape was obtained by the same method as in Example 1.

(Backcoat Layer-Forming Composition B)
Carbon black (average particle size: 38 nm, DBP oil absorption capacity:
   74 cm$^3$/100 g): 100.0 parts
Nitrocellulose: 27.0 parts
Sulfonic acid (salt) group-containing polyester polyurethane resin: 62.0 parts
Polyester resin: 4.0 parts
Polyalkyleneimine polymer synthesized above: See Table 2
α-Alumina (BET specific surface area: 17 m$^2$/g): 0.6 part
Methyl ethyl ketone: 600.0 parts
Toluene: 600.0 parts
Stearic acid: See Table 2
Polyisocyanate (Coronate L made by Nippon Polyurethane Industry Co., Ltd.): 15.0 parts Example 11

With the exception that the ferromagnetic powder was replaced with ferromagnetic metal powder (average particle size (average major axis length): 30 nm, denoted as "MP" in Table 2), a magnetic tape was obtained by the same method as in Example 1.

Example 12

With the exception that backcoat layer-forming composition A was replaced with backcoat layer-forming composition C below, a magnetic tape was obtained by the same method as in Example 1.

(Backcoat Layer-Forming Composition C)

Bengala (average particle size: 0.15 µm, average acicular ratio: 7, BET specific surface area: 52 m$^2$/g): 80.0 parts
Carbon black (average particle size: 16 nm, DBP oil absorption capacity:
74 cm$^3$/100 g): 20.0 parts
Phenylphosphonic acid: 3.0 parts
Vinyl chloride copolymer (MR-104 made by Zeon Corp.): 12.0 parts
SO$_3$Na group-containing polyurethane resin (weight average molecular weight: 50,000, SO$_3$Na groups: 0.07 meq/g): 8.0 parts
Polyalkyleneimine polymer synthesized above: See Table 2
Alumina powder (α-alumina with a BET specific surface area of 17 m$^2$/g): 5.0 parts
Methyl ethyl ketone: 370.0 parts
Cyclohexanone: 370.0 parts
Polyisocyanate (Coronate L made by Nippon Polyurethane Industry Co., Ltd.): 5.0 parts

[Evaluation Method]

<Measurement of 1-Bromonaphthalene Contact Angle>

The 1-bromonaphthalene contact angle was measured by the following method with a contact angle measuring device (Drop Master 700 contact angle measuring device made by Kyowa Interface Science (Ltd.)).

A tape sample, obtained by cutting a prescribed length from one end of a magnetic tape that had been wound into a roll, was placed on a slide glass such that the surface of the magnetic layer was in contact with the surface of the slide glass. A 2.0 µL quantity of measurement liquid (1-bromonaphthalene) was dripped onto the surface of the tape sample (surface of the backcoat layer). After visual confirmation of stable droplet formation, the droplet image was analyzed by contact angle analysis software FAMAS that came with the above contact angle measuring device and the contact angle of the tape sample and the droplet was measured. The contact angle was calculated by the θ/2 method. The arithmetic average of 6 measurements taken for each sample was adopted as the 1-bromonaphthalene contact angle measured on the surface of the backcoat layer. The measurement was conducted in an environment of a temperature of 25° C. and 25% relative humidity. The 1-bromonaphthalene contact angle was obtained under the following analysis conditions.

Method: Liquid drop method (θ/2 method)
Recognition of liquid attachment: automatic
Liquid attachment recognition line (distance from top of needle): 50 dot
Algorithm: automatic
Image mode: frame
Threshold level: automatic <Evaluation of Running Stability>

Servo patterns were formed with a servo writer on the magnetic layers of the magnetic tapes of Examples, Reference Example, and Comparative Examples. Subsequently, the magnetic tapes of Examples, Reference Example, and Comparative Examples were run on a reel tester; the servo signals were pickup up from the magnetic tapes and analyzed with a digital storage oscilloscope; and the amount by which a Linear Tape-Open Generation 6 (LTO G6) standard magnetic recording head was unable to track vertical movement of the magnetic tape (PES) was determined.

The PES measured by the above method was a value that served as an indicator of running stability. The lower the value, the better the running stability indicated. A PES of less than or equal to 70 nm can be determined to indicate good running stability.

Results of the above evaluation are given in Table 2.

TABLE 2

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|---|
| Ferromagnetic powder | | BF | BF | BF | BF | BF | BF | BF | BF | BF | BF | MP | BF |
| Backcoat layer | Thickness/µm | 0.20 | 0.20 | 0.20 | 0.20 | 0.20 | 0.10 | 0.10 | 0.10 | 0.20 | 0.20 | 0.20 | 0.20 |
| | Quantity of polyalkyleneimine polymer added/part | 10.0 | 10.0 | 10.0 | 10.0 | 10.0 | 10.0 | 10.0 | 10.0 | 20.0 | 10.0 | 10.0 | 20.0 |
| | Quantity of stearic acid added/part | 1.0 | 1.5 | 2.0 | 0.5 | 0.3 | 1.0 | 1.5 | 2.0 | 1.0 | 1.0 | 1.0 | 0 |
| Evaluation | 1-bromonaphthene contact angle/° | 20.0 | 24.0 | 29.0 | 15.0 | 12.0 | 16.0 | 21.0 | 25.0 | 27.0 | 24.0 | 18.0 | 16.0 |
| | PES/nm | 51 | 58 | 68 | 62 | 69 | 64 | 52 | 60 | 63 | 55 | 57 | 65 |

| | | Ref. Ex. | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| Ferromagnetic powder | | BF | BF | BF | BF | BF | BF | BF | BF |
| Backcoat layer | Thickness/µm | 0.40 | 0.20 | 0.20 | 0.20 | 0.20 | 0.20 | 0.20 | 0.04 |
| | Quantity of polyalkyleneimine polymer added/part | 0 | 0 | 0 | 0 | 0 | 10.0 | 10.0 | 10.0 |
| | Quantity of stearic acid added/part | 1.0 | 1.0 | 1.5 | 2.0 | 2.5 | 2.5 | 3.0 | 3.0 |
| Evaluation | 1-bromonaphthene contact angle/° | 15.0 | 3.0 | 6.0 | 8.0 | 9.0 | 31.5 | 35.0 | 8.0 |
| | PES/nm | 56 | 103 | 95 | 91 | 90 | 78 | 85 | 93 |

Based on a comparison of Examples and Comparative Examples 1 to 7 shown in Table 2, keeping the 1-bromonaphthene contact angle measured on the surface of the backcoat layer to within a range of 10.0° to 30.0° can be determined to enhance the running stability of a magnetic tape having a backcoat layer with a thickness of less than or equal to 0.20 µm.

A comparison of Reference Example 1 and Comparative Example 1 reveals that the values of the 1-bromonaphthalene contact angles differed greatly despite the formation of backcoat layers using backcoat layer-forming compositions with identical formulas. The reason for this was thought to be that since the magnetic tape of Comparative Example 1 had a thinner backcoat layer than the magnetic tape of Reference Example 1, the quantity of lubricant held in the backcoat layer was smaller. Conversely, Comparative Examples 2 to 4 are comparative examples in which a composition in which the stearic acid had been increased relative to the backcoat layer-forming composition employed in Comparative Example 1 was employed to form the backcoat layer. Compared to Comparative Examples 1 to 4, a tendency toward a higher 1-bromonaphthalene contact angle value was seen as the quantity of stearic acid increased. However, observation by optical microscope of the backcoat layers of the magnetic tapes of Comparative Examples 3 and 4 revealed white deposits. These deposits were thought to consist of precipitates of lubricant that had precipitated out and were not held in the backcoat layer. Raising the 1-bromonaphthalene contact angle to within a range permitting good running stability while adding lubricant in this manner to a backcoat layer the thickness of which had been reduced to less than or equal to 0.20 μm was difficult.

An aspect of the present invention is useful in the technical field of magnetic tapes for data storage, such as backup tapes.

Although the present invention has been described in considerable detail with regard to certain versions thereof, other versions are possible, and alterations, permutations and equivalents of the version shown will become apparent to those skilled in the art upon a reading of the specification. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

What is claimed is:

1. A magnetic tape,
which comprises a magnetic layer comprising ferromagnetic powder and binder on one surface of a nonmagnetic support and comprises a backcoat layer comprising nonmagnetic powder and binder on the other surface of the nonmagnetic support, wherein:
the backcoat layer comprises a nitrogen-containing polymer which is a polyalkyleneimine polymer containing a polyalkyleneimine chain and a polyester chain;
the thickness of the backcoat layer is less than or equal to 0.20 μm; and
the contact angle for 1-bromonaphthalene that is measured on a surface of the backcoat layer falls within a range of 10.0° to 30.0°.

2. The magnetic tape according to claim 1,
wherein the thickness of the backcoat layer falls within a range of 0.05 μm to 0.20 μm.

3. The magnetic tape according to claim 1,
wherein the backcoat layer comprises one or more lubricants selected from the group consisting of a fatty acid, a fatty acid ester, and a fatty acid amide.

4. The magnetic tape according to claim 1,
wherein the contact angle for 1-bromonaphthalene that is measured on the surface of the backcoat layer falls within a range of 12.0° to 29.0°.

5. The magnetic tape according to claim 4,
wherein the backcoat layer comprises:
one or more lubricants selected from the group consisting of a fatty acid, a fatty acid ester, and a fatty acid amide.

6. The magnetic tape according to claim 1,
wherein the contact angle for 1-bromonaphthalene that is measured on the surface of the backcoat layer falls within a range of 15.0° to 27.0°.

7. The magnetic tape according to claim 1,
wherein the contact angle for 1-bromonaphthalene that is measured on the surface of the backcoat layer falls within a range of 18.0° to 25.0°.

8. The magnetic tape according to claim 1,
wherein the nonmagnetic powder contained in the backcoat layer is selected from the group consisting of inorganic powder and carbon black.

9. The magnetic tape according to claim 8,
wherein the nonmagnetic powder contained in the backcoat layer comprises at least carbon black.

10. The magnetic tape according to claim 1,
wherein a nonmagnetic layer comprising nonmagnetic powder and binder is present between the nonmagnetic support and the magnetic layer.

* * * * *